(12) United States Patent
Jerman et al.

(10) Patent No.: US 6,307,818 B1
(45) Date of Patent: Oct. 23, 2001

(54) MAGNETO-OPTICAL HEAD WITH INTEGRAL MOUNTING OF LENS HOLDER AND COIL

(75) Inventors: John H. Jerman, Palo Alto; Joseph E. Davis, Morgan Hill, both of CA (US)

(73) Assignee: Seagate Technology LLC, Scotts Valley, CA (US)

( * ) Notice: Subject to any disclaimer, the term of this patent is extended or adjusted under 35 U.S.C. 154(b) by 0 days.

(21) Appl. No.: 09/329,964

(22) Filed: Jun. 9, 1999

Related U.S. Application Data

(60) Provisional application No. 60/088,611, filed on Jun. 9, 1998.

(51) Int. Cl.[7] .................................................. G11B 11/00
(52) U.S. Cl. ............................................................. 369/13
(58) Field of Search ................................. 369/13, 14, 110, 369/116, 112, 44.14; 360/114, 59, 102, 103, 101

(56) References Cited

U.S. PATENT DOCUMENTS

| 5,105,408 | * | 4/1992 | Lee et al. ..................... 369/44.15 |
| 5,886,959 | * | 3/1999 | Bischoff et al. ................... 369/13 |
| 5,903,525 | * | 5/1999 | McDaniel et al. ................ 369/13 |
| 5,978,319 | * | 11/1999 | Wang et al. ...................... 369/13 |
| 6,016,290 | * | 1/2000 | Chen et al. ...................... 369/13 |
| 6,049,430 | * | 4/2000 | Heanue et al. ................. 359/642 |
| 6,069,853 | * | 5/2000 | Novotny et al. ................. 369/13 |
| 6,091,694 | * | 7/2000 | Spath ............................. 369/112 |
| 6,130,779 | * | 10/2000 | Carlson et al. ................ 359/566 |
| 6,130,864 | * | 10/2000 | Burroughs ....................... 369/13 |

* cited by examiner

Primary Examiner—Tan Dinh
(74) Attorney, Agent, or Firm—Thomason, Moser & Patterson, LLP

(57) ABSTRACT

An integrated coil support and lens holder assembly for a magneto-optical read/write head defined on at least one wafer with a coil supported on a first surface including leads extending to an electrical feedthrough supported in part on the first surface, a lens supporting region supporting a lens in alignment with an open center region of the coil, an electrical feedthrough region defined adjacent the lens and extending through the integrated coil support and lens holder assembly to a second surface, an electrical contact layer extending through to the first surface to contact the electrical cross-over region for the coil, and ABS features incorporated in the integrated coil support and lens holder assembly.

8 Claims, 19 Drawing Sheets

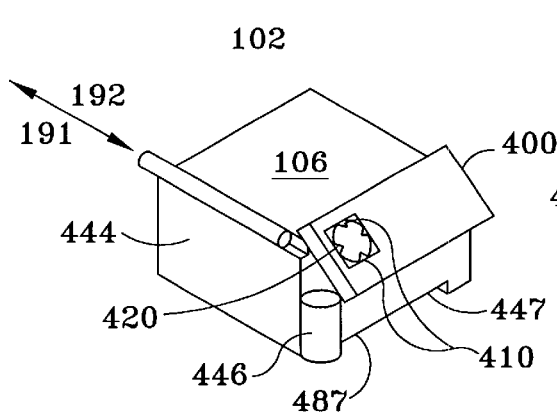
Figure 4A
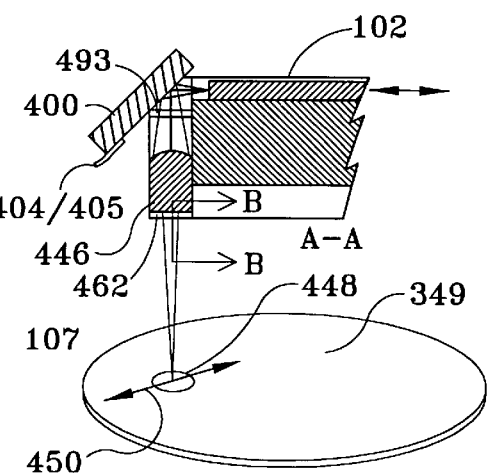
Figure 4B
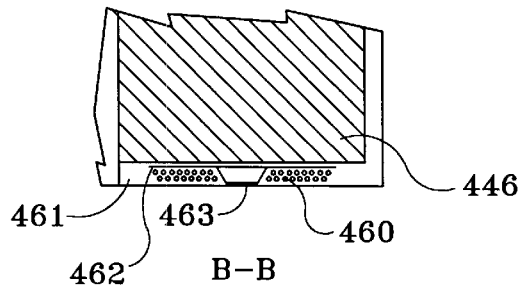
Figure 4C
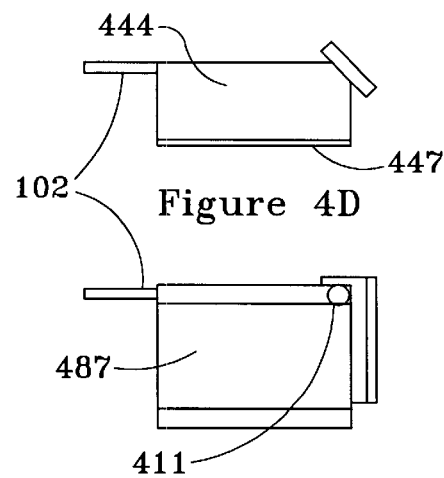
Figure 4D
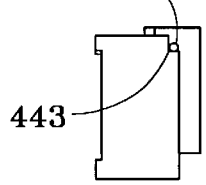
Figure 4G
Figure 4F
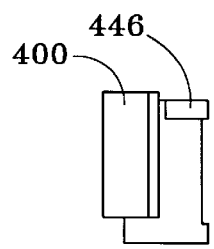
Figure 4E
Prior Art

MAGNETO-OPTICAL HEAD WITH INTEGRAL MOUNTING OF LENS HOLDER AND COIL

CROSS-REFERENCE TO A RELATED APPLICATION

The present application claims priority to Provisional Application No. 60/088,611 filed Jun. 9, 1998, which is incorporated herein by reference.

FIELD OF THE INVENTION

The present application is related to magneto-optical data storage systems and particularly to a head design optimized for a magneto-optical data storage system.

BACKGROUND OF THE YENTION

Traditional hard disc magnetic recording technology has long been believed to be subject to a physical capacity limit known as the super paramagnetic effect. The term refers to a point at which discrete magnetic areas on a disc surface becomes so tiny that their magnetic orientation was assumed to be unstable at room temperature, rendering the data storage unreliable.

Hard disc technology has also been limited by conventional magnetic head designs. A typical prior art Winchester magnetic storage system includes a magnetic head that has a slider element. A magnetic read/write element is coupled to a rotary actuator magnet and coil assembly by a suspension on the slider element. An actuator arm forming a part of the slider element and holding the coil assembly in suspension is positioned over a surface of a spinning magnetic disc. In operation, lift forces are generated by aerodynamic interactions between the magnetic head and the spinning magnetic disc, pulling the head away from the disc. The lift forces are opposed by equal and opposite spring forces applied by the suspension such that a predetermined flying height for the head is mainta over a full radial stroke of the rotary actuator assembly above the surface of the spinning magnetic disc.

Flying head designs have been proposed for use with magneto-optical storage technology, but have heretofore been difficult to realize in commerce. One factor that continues to limit MO disc drives is the physical size of the head necessary to hold the various components required for accessing magneto-optical information. Conventional magneto-optical heads, while providing access to magneto-optical discs with aerial densities on the order of 1 gigabit per square inch, have been based on relatively large optical assemblies, and the physical size and mass of the heads have made them rather bulky (on the order of 3–15 mm in a dimension). This is because the heads must carry both optics focusing the laser beam on a spot on the disc, and an electromagnetic coil surrounding the lens for establishing the applied magnetic field, which is also a part of the accessing process. A typical prior art head is shown in FIG. 1, which is an example of a present head design and a method for making it. In FIG. 1 the head was built up on a substrate 14 which is coated with a layer of alumina 15. In this example, two layers 10, 12 were deposited on the surface. These coils were energized to establish the magnetic field. A layer of permalloy 13 was plated over the top of the coils to assist in focussing the magnetic field generated by the coils on the media being accessed. The size and number of coils has been established in the technology and is not specifically discussed. At the edge of the head, bond pads 16 were provided to which wires were bonded to make attachments to the rest of the system. These wires were the leads for carrying signals away from the head. The coils 10, 12 surrounded an opening in the substrate 14 where a lens 18 was mounted which comprises the objective lens for focusing the laser output on the storage media to be accessed. A generally cylindrical graduated reflective index (GRIN) lens was adhesively attached to a vertical slot 17 in the slider and fixed in place there.

Among the difficulties posed by this design was that the heads are quite e fragile and thus difficult to process without substantial losses. Further, substantial heat was generated relative to the size of the head and it became difficult to successfully conduct the heat away from the head. Further, the device lacked dimensional stability, and had a tendency to curl.

Such systems had several limitations in addition to being subject to bending. The coils 10, 12 were relatively weak mechanically and difficult to align and attach to the slider body. In addition, the coils were thermally inefficient. The power dissipated in the coil during data writing operations caused the coil to heat and flex due to thermal expansion differences between the various layers.

A further difficulty with such designs was that the adhesive attachment of the cylindrical lens to a machine channel in the slider body. It did not allow accurate placement of the lens with respect to the other parts of the body, and did not allow the attachment of miniature, molded lenses for use in the head assembly. Further, the head being of extremely small dimension was extremely difficult to handle during mounting.

SUMMARY OF THE INVETION

To push beyond the limitations of the prior art, research was directed to magneto-optical (MO) recording, which combines microscopic optical lasers with traditional magnetic recording technology. Realizing the full potential of such high density storage depends heavily on optimized head design.

Therefore, the objective of the present invention is to provide an improved head design for a magneto-optical disc drive.

A further objective of the present invention is to provide an improved head which is simpler to fabricate and dimensionally stable.

A further objective of the invention is to provide a design wherein the lens, either a GRIN or molded lens, is stably mounted within the head.

Yet another objective of the present invention is to utilize micromachining techniques to provide a simple, easily replicated process for making the heads.

Yet another objective of the invention is to incorporate the coils within the head layers so that they are mechanically strengthened, and properly and consistently aligned with the remainder of the head and the lens. A number of novel processes and designs are disclosed herein for achieving one or more of these goals as well as providing other advantages over the prior art.

In one embodiment of the present invention, a holder is fabricated using deep reactive ion etching (DRIE) of a silicon substrate to provide a part that can be adhesively attached to the current planar coil design. This silicon holder strengthens the coil and provides improved thermal conduction from the coil itself to the slider. One embodiment provides a convenient handle to allow precise adjustment of the coil with respect to the slider during assembly. As will be disclosed, a lens, such as a GRIN lens, can be attached either adhesively in a vertical slider groove or in a separately fabricated lens holder which can be located and attached to the slider. Alternatively, a molded lens can be first mounted to a similar lens holder and attached to the slider. Appropriate design of the holders can allow either the lens-holder combination or the coil-holder combination to be attached to the slider first, or both can be attached at the same time, allowing more flexibility in the assembly process.

The small size of the coils, lenses, and holders makes handling of these parts difficult. An embodiment of the present invention provides handles for the holders that extend from the region where the coils and lenses are attached. These handles can be as large as necessary to allow convenient temporary attachment to assembly tooling by way of mechanical clamping or vacuum holding. Precise notches are provided on a narrow support connecting the handles and the holders, so that sufficient rigidity exists for the adjustment and attachment of the holders to the sliders. Following the curing of the attachment adhesive, the handles can be removed by fracturing of the silicon at the provided notches. The uniform fracture behavior of the crystalline silicon and the precision provided by silicon processing allows acceptable control of the fracture force.

In a second embodiment of the present invention, planar arrays of coils on a substrate and a planar array of holders are fabricated and adhesively attached. The coils can then be released from their substrate using a sacrificial layer and etchant, and the holders can be separated by either mechanical sawing, laser cutting, or by snapping the holders from their substrate at appropriately notched attachment regions. These methods provide convenient handling of the small coil parts and conveniently attaches large numbers of coils and holders simultaneously.

In this embodiment, conventional wire bonds are made through holes in the holder to pads connected to the coil itself. These wire bonds can be made either to separate pads on the holder or slider, and the wires are extended the length of the head suspension.

In a third embodiment, coil wafers and holders are adhesively attached in a similar way to the second embodiment, but electrical connections to the coil are made with plated vias through the holder wafer. This prevents mechanical damage to the coil assemblies due to thermocompression or thermosonic bonding to the pads.

In a fourth embodiment, the coil and lens holders would be fabricated in a monolithic form, where the substrate of the coil would also be the lens holder. In this embodiment, appropriate recesses and holes through the substrate are fabricated to provide mounting surfaces for the GRIN or molded lenses and to provide access for the light to the recording media.

In a fifth embodiment, planar coils are fabricated in a recess on one surface of a silicon substrate which is also patterned with features that act as ABS rails for the slider. Micromachined features are fabricated to provide attachment surfaces for the lens and folding mirror of the structure, and a groove for the optical fiber light input for the head.

In a sixth embodiment, a dielectric window is incorporated in the coil structure to prevent debris from accumulating in the hole which was provided in prior art thin film coil structures. The thicknesses and material choices for the window materials need to be chosen carefully to minimize optical aberrations and loss in the light path. One choice of materials is to use a silicon dioxide, ¼ wavelength AR coating, with a refractive index of about 1.45, on both sides of a 1–2 um thick silicon-rich silicon nitride membrane, deposited such that the refractive index is the square of the value of the silicon dioxide, roughy 2.10. Since the light from the high-NA lenses used in these system has significant energy off of normal incidence, the thickness of the AR coating layers will actually be slightly less than ¼ wavelength thick. This window can be deposited either as the base for a coil at the start of fabrication, or on top of a sacrificial layer of polymer material or sacrificial oxide, as described in more detail, below. An alternative method is to deposit a layer of nitride or alumina as part of the coil structure, fabricate the coils, then deposit AR coatings on both sides of the otherwise finished coils, reducing the number of processing steps that the AR coatings are exposed to.

Other features and advantages of the present invention will be apparent to a person of skill in the art from the present invention disclosure, which is given with respect to the figures briefly described below.

BRIEF DESCRIPTION OF THE DRAWINGS

The views and charts in FIGS. 1 through 12 below represent embodiments of the prior art and/or of the invention, and are not to be construed as reading either the prior art or the invention in an exclusive way.

FIG. 4a–g is a collection of detailed views of a part of a disk assembly as in FIG. 1A which better describe the head of the invention and further show details of the slider the head is assembled into.

DETAILED DESCRIPTION OF THE PREFERRED EMBODIMENTS

Figure 1A:
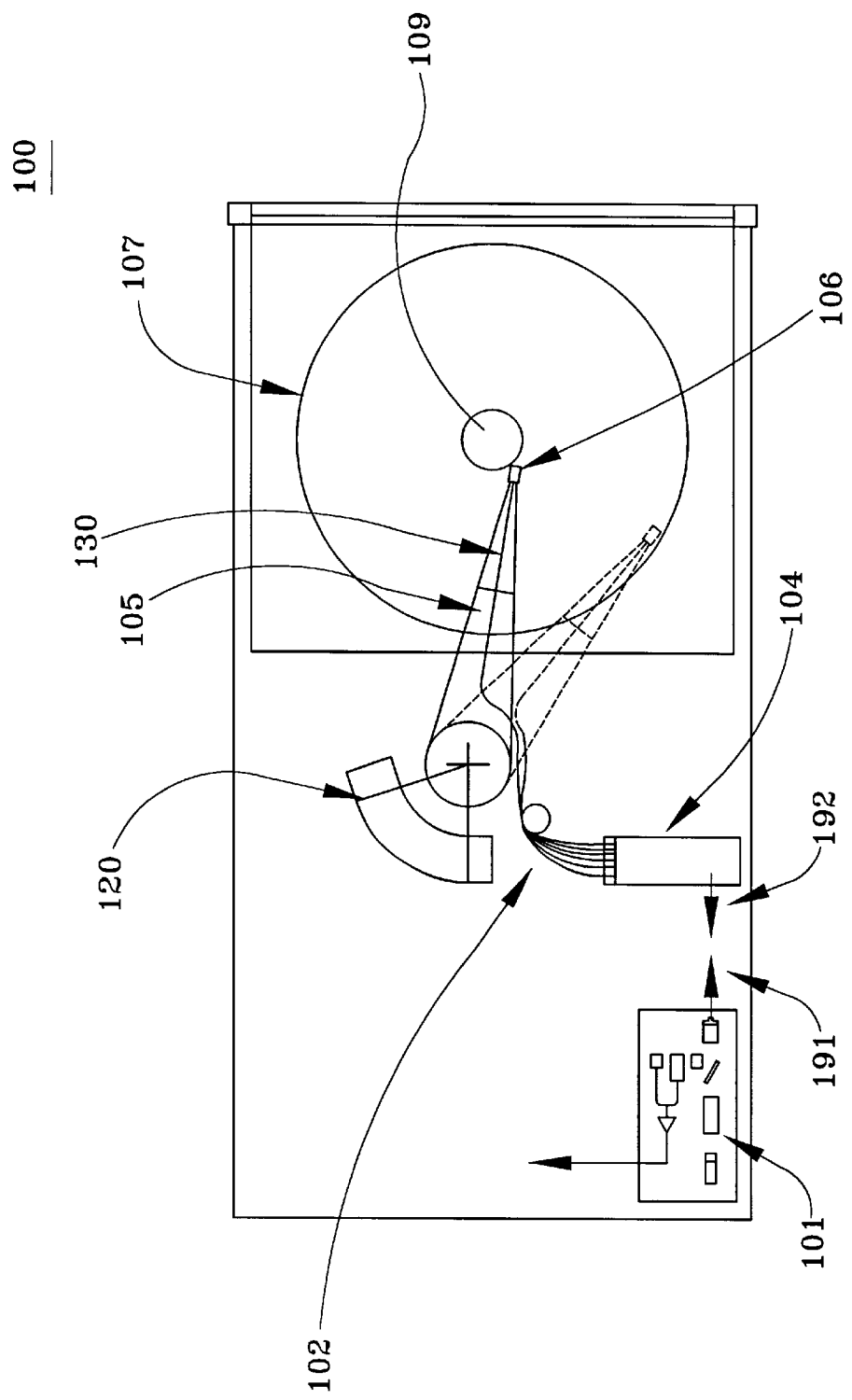
FIG. 1A is a disk assembly relating to both the prior art and to the invention.
Figure 1B:
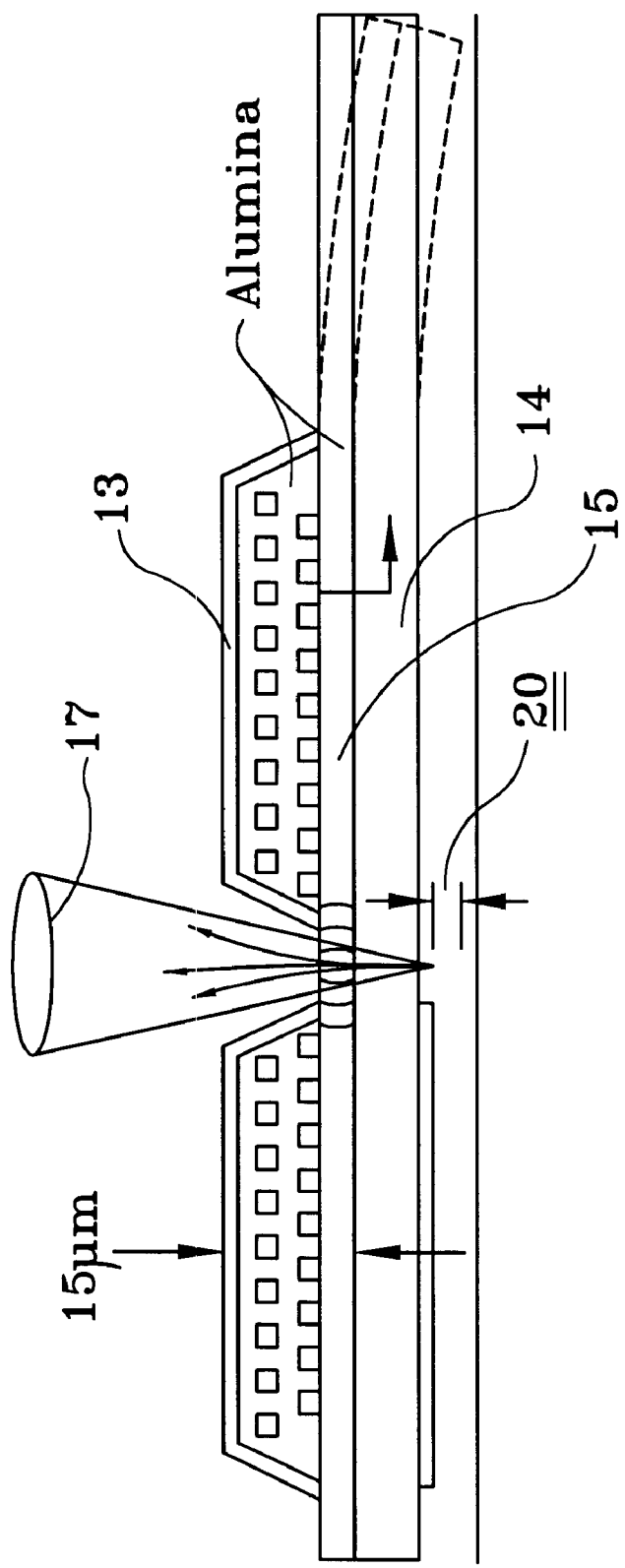
FIG. 1B is a prior art magneto-optical flying head, which is the sensor part of the system relating to a disk assembly as in FIG. 1A.

Refering now to the drawings, FIG. 1 is a plan view illustrating some of the basic elements of a magneto-optical data storage and retrieval system. Few specific details are identified in this and FIGS. 2 through 4 as they are intended to portray some of the basic elements of a functional system in which the present invention is useful. The invention is not limited to use a specific MO data storage system.

Referring to FIG. 1, the system 100 includes a set of flying heads 106 whose details will be described below that are adapted for use with MO discs 107. In the example, the discs are double sided. One flying head 106 is provided for each MO disc surface 107. The heads 106 are coupled to a rotary actuator magnet and coil assembly 120 by a suspension 130 and actuator arm 105 to be positioned over the surfaces of the MO discs 107. In operation, the MO discs 107 are rotated by a spindle motor 109 to generate aerodynamic lift forces between the flying heads 106 and the rotating disc. This maintains each flying MO head 106 in a flying condition above the data recording surface of each MO disc. The lift forces are opposed by equal and opposite spring forces supplied by the suspensions 130. During non-operation, each flying MO head is maintained statically in a storage condition away from the surface of the MO disc 107, typically on a ramp (not shown) adjacent to the disc surface. It is of course possible that the heads could be landed on the surface of the disc in a non-data storage region; however, such an approach would not be the optimum approach.

System 100 further includes a laser-optics assembly 101, an optical switch 104, and a set of single mode PM (polarization maintaining) optical fibers 102. In the exemplary embodiment, each set of single mode PM optical fibers 102 are coupled through a respective one of the set of actuator arms 105 and suspensions 130 to a respective one of the set of flying MO heads 106.

Figure 2:
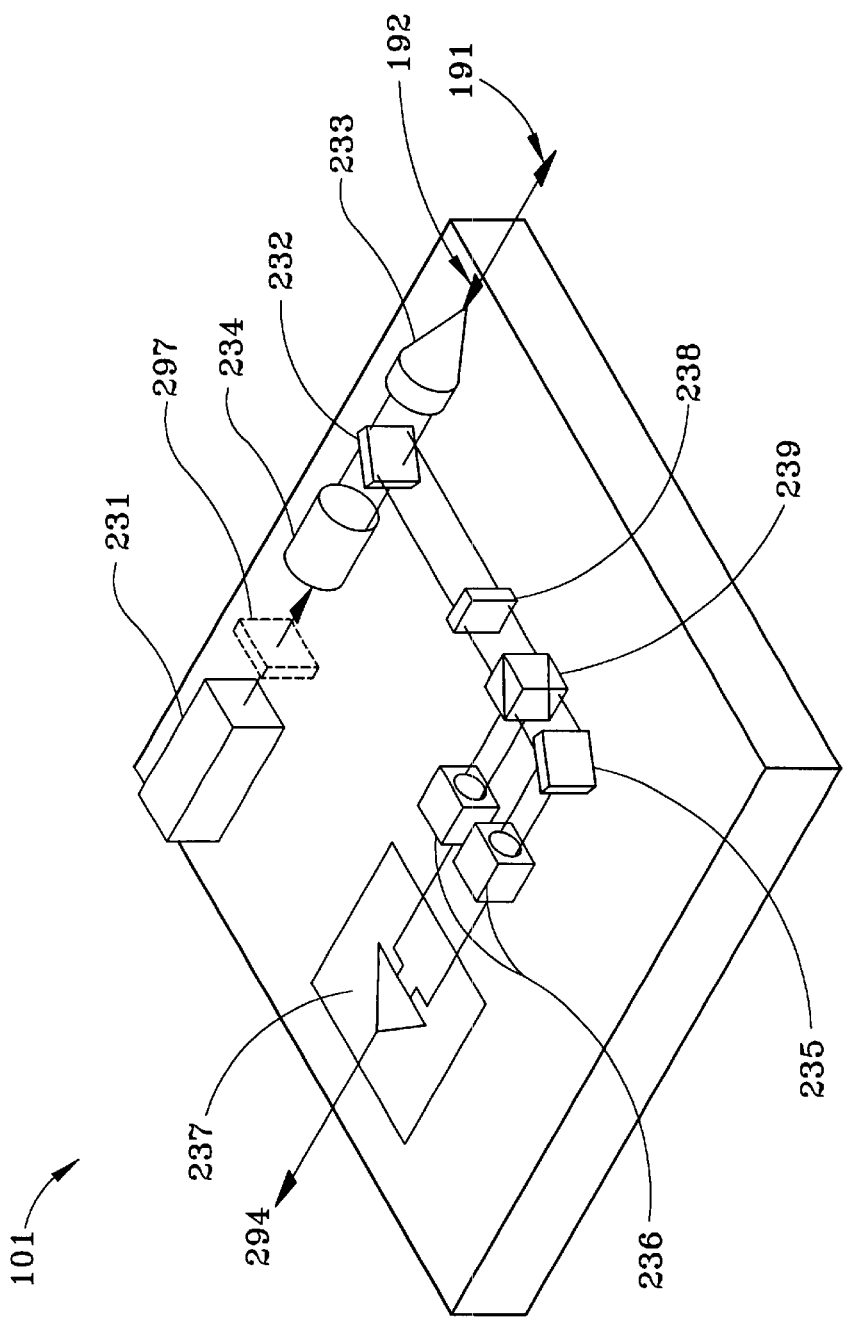
FIG. 2 is a more detailed view of the part of a disk assembly as in FIG. 1A showing the optics for the magneto-optical technology.

FIG. 2 is a diagram showing the laser-optics assembly 101 of the magneto-optical data storage and retrieval system of FIG. 1. As will now be explained with respect to FIGS. 2 and 3, reading and storing information on the surface of each disc 107 requires both conveying the output of a laser through a fiber-optic to the flying head so that the light output is accurately imaged on the surface of the disc and generating a magnetic field utilizing a coil which is supported on the flying head 106 near to the surface of the disc. The description of FIGS. 2 and 3 will briefly summarize the reasons for providing both a light source and a magnetic field to selectively access the data on the surface of the disc. In FIG. 2, the laser-optics assembly 101 is shown to include a linearly polarized diode laser source 231 operating in a visible or near ultraviolet wavelength region and emitting an optical power sufficient for reading and writing using the set of MO discs 107. In a first embodiment, the laser diode source may be a RF modulated laser source. In a second embodiment, the linearly polarized laser source 231 may be a distributed feed-back (DFB) laser source. In an exemplary embodiment, the linearly polarized laser source 231 is selected to operate within a range 635–685 nm; however, a laser source of other wavelengths could also be used. The laser-optics assembly 101 further includes: a collimating optics 234, a low wavelength dispersion leaky beam splitter 232, and a coupling lens 233. The laser-optics assembly 101 directs (from the linearly polarized laser source 231) a linearly polarized outgoing laser beam (shown in FIG. 1) to the optical switch 104. The laser-optics assembly 101 further includes: a ¼ wave plate 238, a mirror 235, and a polarizing beam splitter 239. In the first embodiment, a linearly polarized reflected laser beam 192 (shown in FIG. 1) is directed by the optical switch 104 to the coupling lens 233, and is routed by the leaky beam splitter 232 to a differential detector comprising: the ¼ wave plate 238, the mirror 235, and the polarizing beam splitter 239. In the second embodiment, an optical isolator 297 is included between the laser source 231 and the collimating lens 234. As is well established in the art, this type of differential detection scheme measures the optical power in two orthogonal polarization components of the reflected laser beam 192, with a differential signal being a sensitive measure of polarization rotation induced by the Kerr effect at the surface of one of the set of MO discs 107. In both embodiments, after conversion by a set of photodiodes 236, the differential signal is processed by the differential amplifier 237 for output as signal 294. The present invention is not meant to be limited to the aforementioned arrangement of optical elements and sources of light, as other techniques for directing the outgoing laser beam 191 and for detecting the reflected laser beam 192 are well known in the art.

Figure 3:
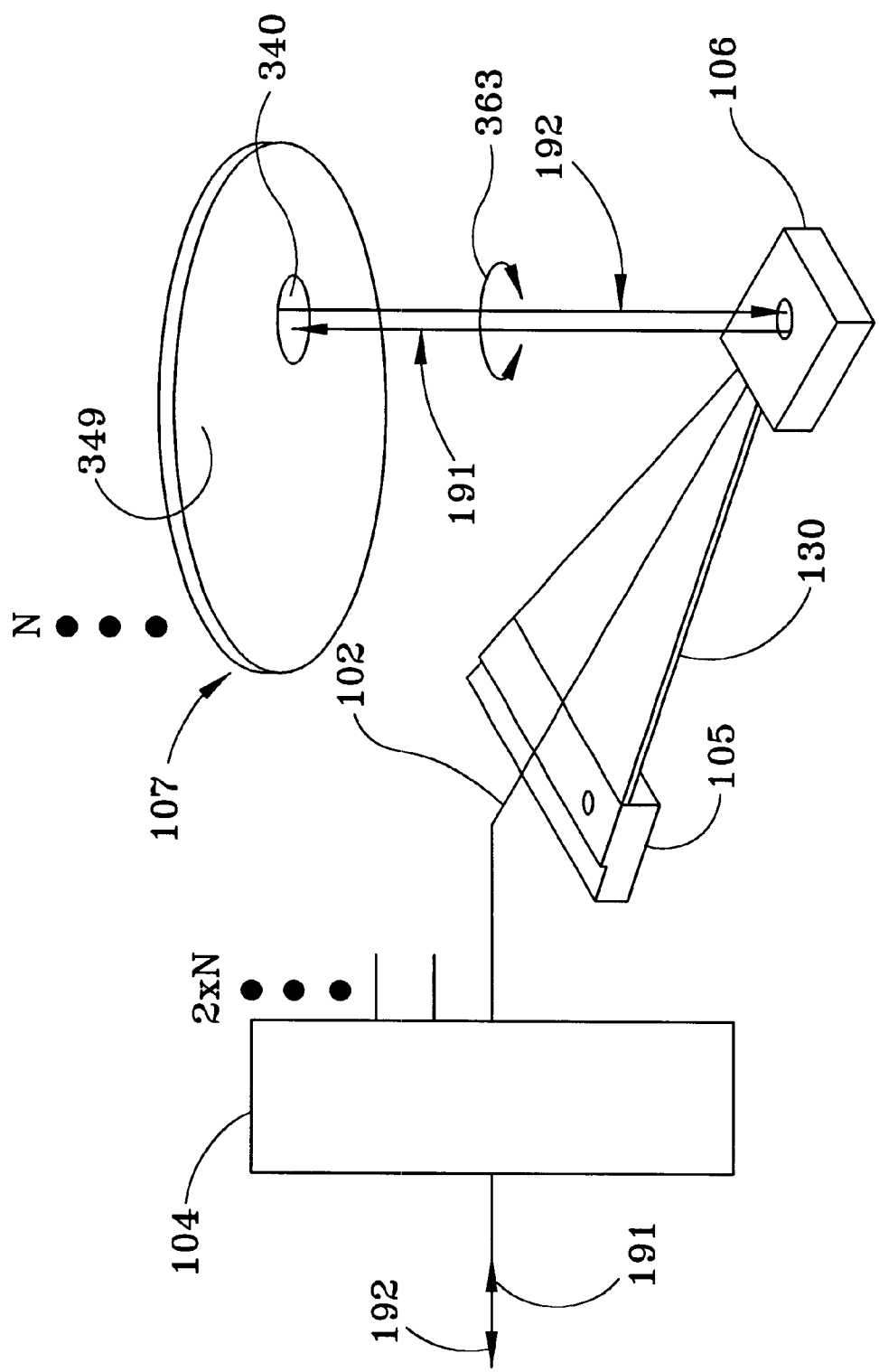
FIG. 3 is another more detailed view of a part of a disk assembly as in FIG. 1A showing the actuator arm having a slider thereon with a head therein.

FIG. 3 is a diagram showing a representative optical path that includes the use of a DFB laser source. In a preferred embodiment, a representative optical path is shown in FIG. 3 to include: the optical switch 104, one of the set of single-mode PM optical fibers 102, and one of the set of flying MO heads 106. The optical switch 104 provides sufficient degrees of selectivity for directing the outgoing laser beam 191 (with reference to laser source 231) to enter a respective proximal end of a respective single-mode PM optical fiber 102. The outgoing laser beam 191 is further directed by the single-mode PM optical fiber 102 to exit a respective distal end so as to pass through the flying MO head 106 on an actuator arm 105 and a suspension 130 writing onto a recording/storage layer 349 of a respective MO disc 107.

[In the preferred embodiment the outgoing laser beam 191 is provided by a linearly polarized laser source 231 that is a DFB laser source. A distributed feed-back (DFB) diode laser source, unlike an RF-modulated Fabry-Perot diode laser, produces a very narrowband single-frequency output due to the use of a wavelength selective grating element inside the laser cavity. When linearly polarized light from a laser source 231 that is a DFB laser source is launched into a single-mode PM optical fiber 102, the light exiting the optical fiber includes a polarization state that depends on the relative orientation between the fiber axes and the incident polarization, and moreover, the output polarization state is very stable in time as long as external perturbations which alter the fiber birefiingence are negligible. This behavior is in contrast to that observed with an RF-modulated Fabry-Perot diode laser source which is characterized by high-frequency fluctuations in its spectral output. With a RF modulated laser source, when linearly polarized light is launched into a single-mode PM optical fiber 102, the laser wavelength fluctuations lead to corresponding polarization fluctuations at the output of the fiber. The resulting polarization noise is minimized when the incident light is launched with its polarization axis aligned with one of the axes of the fiber (discussed below), but even in this case the polarization noise is larger than the corresponding DFB laser case owing to wavelength dependent mode coupling (mode coupling in PM fibers is a phenomenon whereby a small portion of the light that is being guided along one polarization axis is coupled into the orthogonal axis by intrinsic or stress-induced defects). In MO recording it is preferable that the polarization noise be kept to a minimum, such that a signal-to-noise ratio (SNR) in the range of 20–25 dB can be achieved. The present invention identifies that a DFB laser source enables use of the single-mode PM optical fiber 102 for delivery and return of polarized laser light to and from the MO disc 107 while maintaining the aforementioned SNR.]

During writing of information, the outgoing laser beam 191 is selectively routed by the optical switch 104 to the MO disc 107 so as to lower a coercivity of the recording/storage layer 349 by heating a selected spot of interest 340 to approximately the Curie point of the recording/storage layer 349. Preferably, the optical intensity of outgoing laser beam 191 is held constant, while a time varying vertical bias magnetic field is used to define a pattern of "up" or "down" magnetic domains perpendicular to the MO disc 107. This technique is known as magnetic field modulation (MFM). Alternatively, outgoing laser beam 191 may be modulated in synchronization with the time varying vertical bias magnetic field at the spot of interest 340 in order to better control domain wall locations and reduce domain edge jitter. Subsequently, as the selected spot of interest 340 cools, information is encoded within the recording/storage layer 349 of the respective spinning disc 107.

During readout of information, the outgoing laser beam 191 (at a lower intensity compared to writing) is selectively routed to the MO disc 107 such that at any given spot of interest 340, the Kerr effect causes (upon reflection of the outgoing laser beam 191 from the recording/storage layer 349) a reflected laser beam 192 to have a rotated polaiization of either clockwise or counter clockwise sense 363 that depends on the magnetic domain polarity at the spot of interest 340.

The aforementioned optical path is bi-directional in nature. Accordingly, the reflected laser beam 192 is received through the flying MO head 106 and enters the distal end of the single-mode PM optical fiber 102. The reflected laser beam 192 propagates along the single-mode PM optical fiber 102 to exit at its proximal end and is selectively routed by the optical switch 104 for transmission to laser-optics assembly 101 for subsequent conversion to the signal 294.

FIGS. 4a–g are diagrams showing the flying magneto-optical head of the magneto-optical data storage in a perspective, a side cross-sectional, an expanded cross-section, a side, a front, a bottom, and a rear view, respectively. In FIG. 4a–g, the flying MO head 106 is shown for use above a recording/storage layer 349 of one of the set of MO discs 107. The flying MO head 106 includes: a slider body 444, an air bearing surface 447, a quarter-wave plate 493, a reflective substrate 400, objective optics 446, a magnetic coil 460, and a yoke 462. The slider body 444 is dimensioned to accommodate the working distances between the objective optics 446, the single-mode PM optical fiber 102, and the reflective substrate 400. The reflective substrate 400 may include a reflective surface which is aligned so as to direct the outgoing laser beam 191 and 192 to and from the recording/storage layer 349. Although slider body 444 may include industry standard "mini", "micro", "nano", or "pico" sliders, alternatively dimensioned slider bodies 444 may also be used (as determined by the aforementioned dimensional constraints of the elements used with the flying MO head 106). Accordingly, in the preferred embodiment, the slider body 444 comprises a mini slider height (889$\mu$m) and a planar footprint area corresponding to that of a nano slider (1600×2032$\mu$m).

The single-mode PM optical fiber 102 is coupled to the slider body 444 along an axial cutout 443, and the objective optics 446 is coupled to the slider body 444 along a vertical comer cutout 411. Although in the preferred embodiment the axial cutout 443 is located along a periphery of the slider body, and the vertical cutout 411 is located at a corner of the slider body 444, the axial cutout 443 and the vertical cutout 411 may be located at other positions on the flying MO head 106, for example, between the periphery and a central axis or, alternatively, along the central axis itself With respect to the present invention, attention is especially directed to FIGS. 4c and 4b. These two figures show the objective optics 446 which are used to focus the optical spot in a defined size 448 on the surface 349 of the disc. The spot is focused through a yoke 462 and low profile magnetic coil 460 which are incorporated in support structure 461 and mounted on the bottom of the flying MO head or on or near the surface of the objective optics 446, without interfering with the aerodynamic flying qualities of the flying MO head 106. It is the fabrication of the structure 461 incorporating the planar coils 460 surrounding the opening 463 through which the light is to be conveyed to the disc surface that is the particular subject of this invention. It will be further seen below that the present invention also solves the problem of bringing in the lead wires which supply current to the coil structure 460 while establishing reliable electrical connections to these coils but without adding to the complexity of the design.

Figure 5:
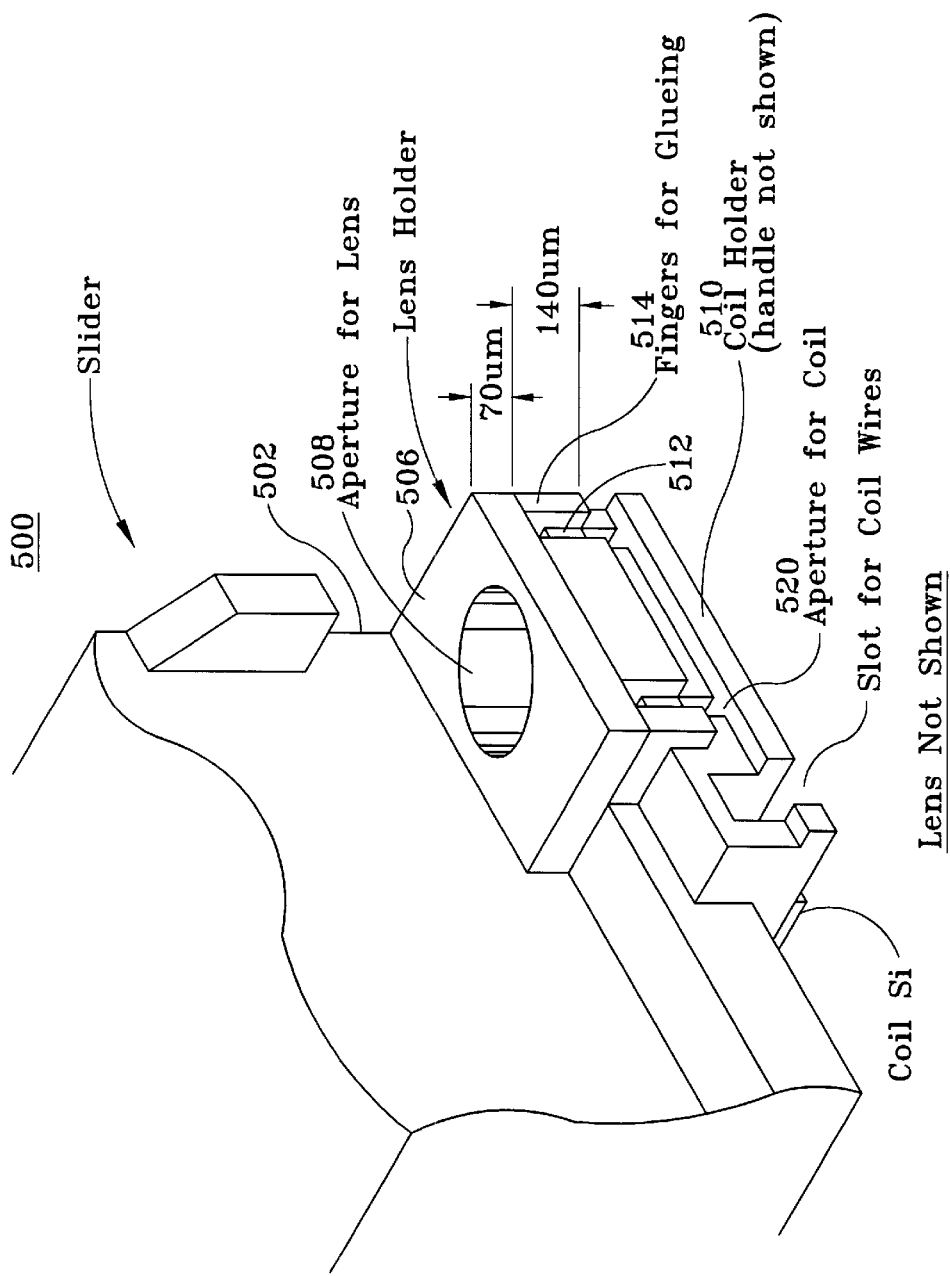
FIG. 5 is another detailed view of parts of a disk assembly as in FIG. 1A in which details of the head assembly being mounted on a slider are disclosed.

FIG. 5 is a more detailed perspective view of a the coil holder of the present invention cooperating with a lens holder and supported from the slider. A slider 500 supports the coil and lens and optics to fly over the surface of the disc. This technology is well developed in the art, and further details of the slider are not disclosed herein.

Supported at the front edge 502 of the slider and typically at a corner of the slider is a lens holder 506 which includes an aperture 508 for the lens which conveys the light to the surface of the disc. Also shown is the coil holder 510. As shown, and as can be further seen in the perspective view of FIG. 6, the lens holder 506 is attached to the coil holder 510 byvirtue of interlocking fingers 512, 514 provided on the two elements. The coil holder 510 also includes an aperture 520 which is not shown in FIG. 5 but which is surrounded by the coil 522 fither surrounding the aperture and is incorporated in the coil chip 524 also shown in FIG. 6. The FIG. 6 perspective view also shows the bonding pads 530 which must be incorporated in coil chip 524 to provide lead connections from the coil chip so that power can be supplied from the external environment to the coil 522. This invention is primarily concerned with fabrication of the coil chip 524 which according to the present embodiment is to be fabricated to incorporate the coils in a rugged, reliable design surrounding a window 520 through which a light beam may be focused onto the disc. The window, rather than being open as in prior art designs, is to be fabricated as a part of one or more steps of the micromachining process which will not only incorporate the window into the finished design, but incorporate materials in the window to reduce reflections.

Figure 7A:
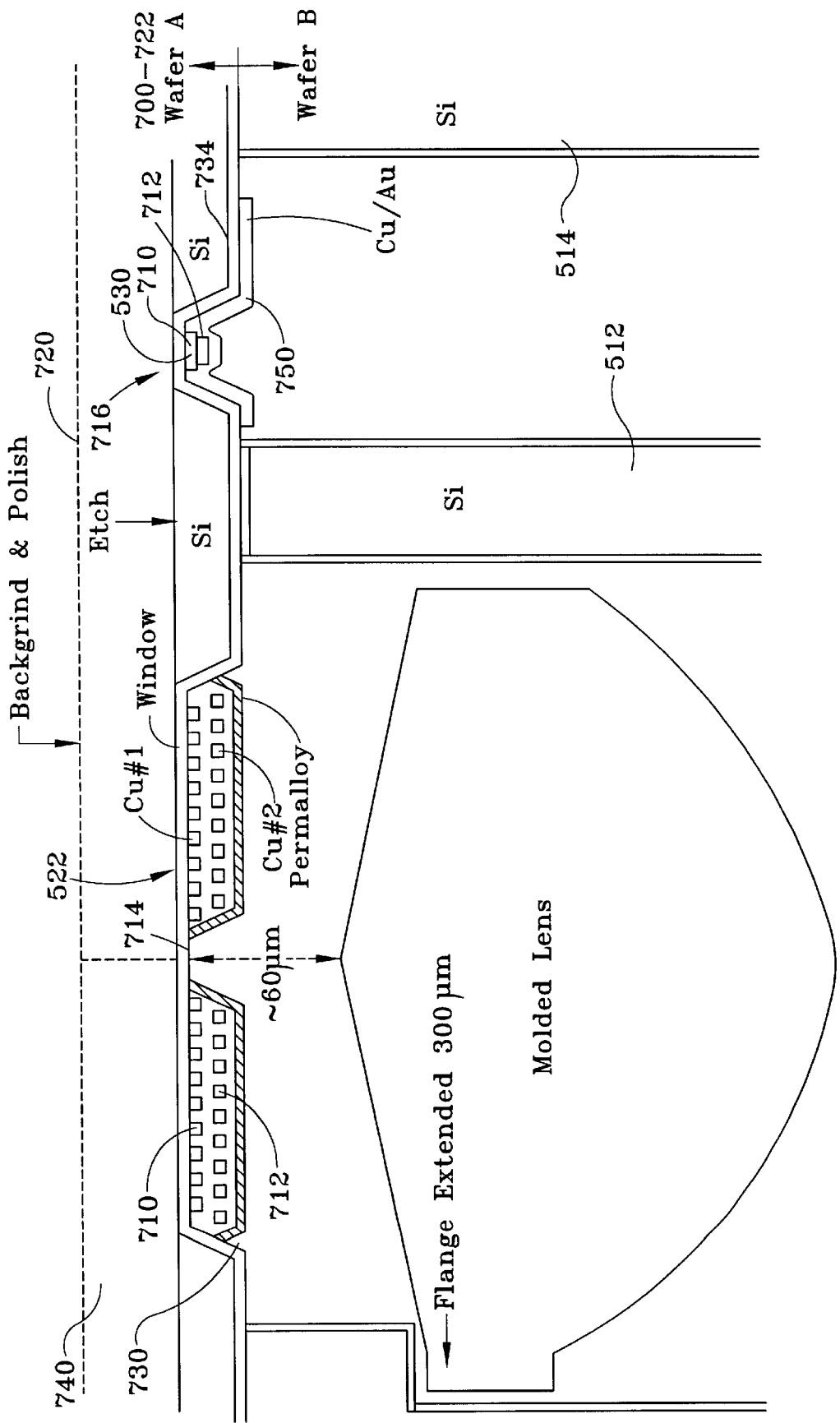
FIG. 7A is a more detailed view of a part of the disk assembly of FIG. 6 showing in more detail how an integrted lens holder and a feedthrough are incorporated with a coil and a window.
Figure 7B:
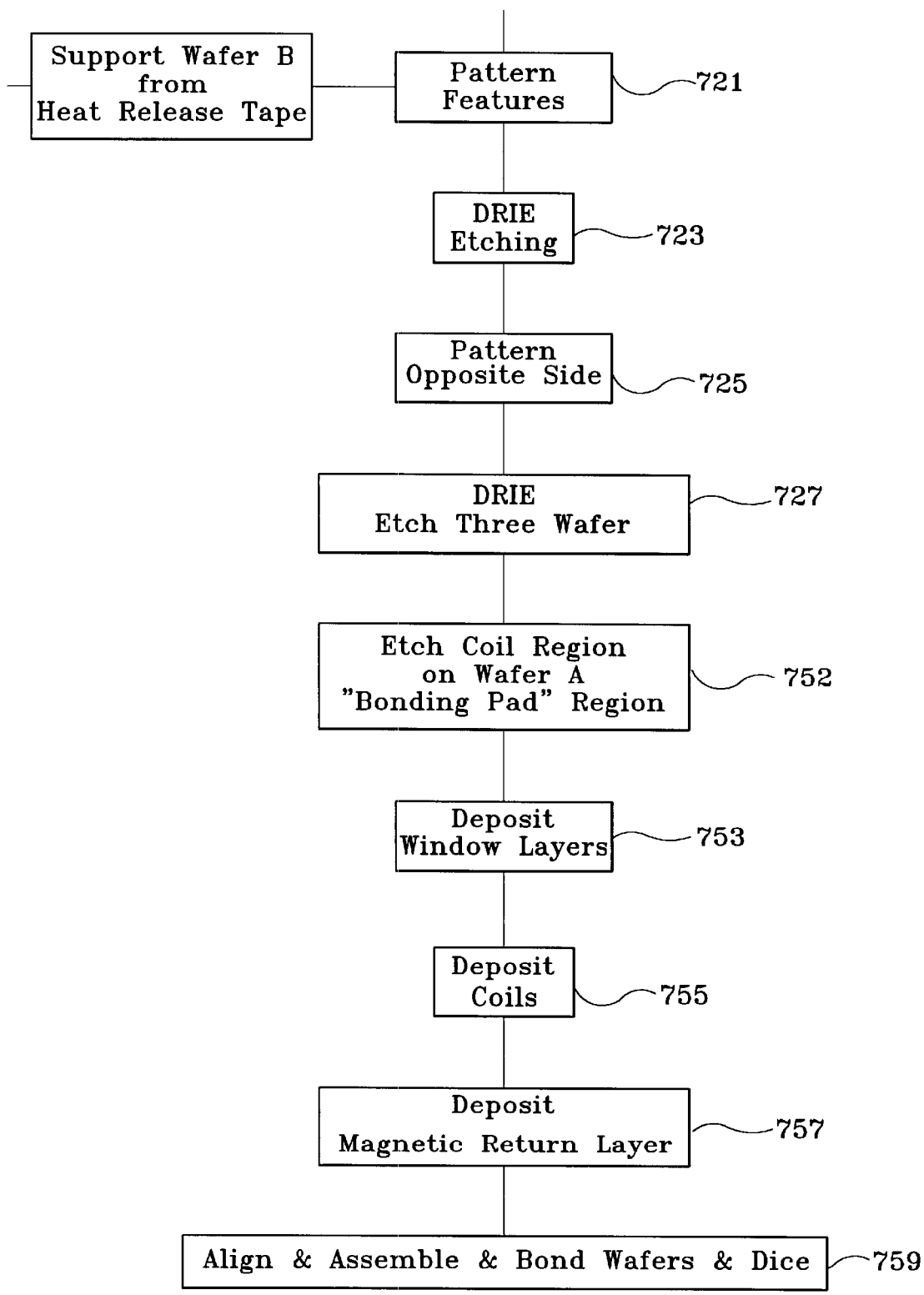
FIG. 7B is a process flow chart illustrating how a part as in FIG. 7A might be realized.

Turning for example to FIG. 7A 700 this embodiment is an assembly molded from two wafers, one wafer incorporating the coils, and the other the lens holder, by dividing the features between the two wafers, and then assembling the finished product from the two wafers using the process outlined in FIG. 7B. While some of the dimensions and the like are described for a molded lens variant, the process for a GRIN lens is very similar and is not discussed separately. The example of FIG. 7A includes a first wafer A 720 whose surface is generally indicated by the line 701 and which will include one set of coils 710, 712 as well as the window 714 through which the focused light will be transmitted. The wafer also includes a separate region generally indicated at 716 through which connections for the ends of the coils 710, 712 can be made to an external power source. The second wafer, wafer B, 720 is the lens support wafer, as shown it will hold a molded lens; however the process for supporting a holder for a GRIN lens would be substantially the same. The wafers are separately processed and then bonded face-to-face at the line 701 to form a completed device.

Thus referring specifically to the embodiment characterized by wafer A 720 beginning with a wafer provided with alignment marks on both sides of the wafer to facilitate later alignment of features on both the front side (facing line 701) and the backside 720 of the wafer using a double-sided mask aligner to facilitate later alignment of features on front and back sides of each wafer. Features are lithography patterned on the front side 722 of wafer A and DRIE etched to a depth of about 70 μm. Features are then lithographically patterned on the back side 720 of wafer A and DRIE etched to a depth necessary to meet the features etched from the front side. During this DRIE step, the wafer is attached to an adhesive tape which has a heat release feature (not shown). This etching step releases the individual parts from the wafer, and the heat release tape supports the pieces during subsequent handling. Before assembly, the tape is subjected to the appropriate temperature for release, typically in the range of 100° C., and the individual holders can be easily removed from the tape.

Figure 6:
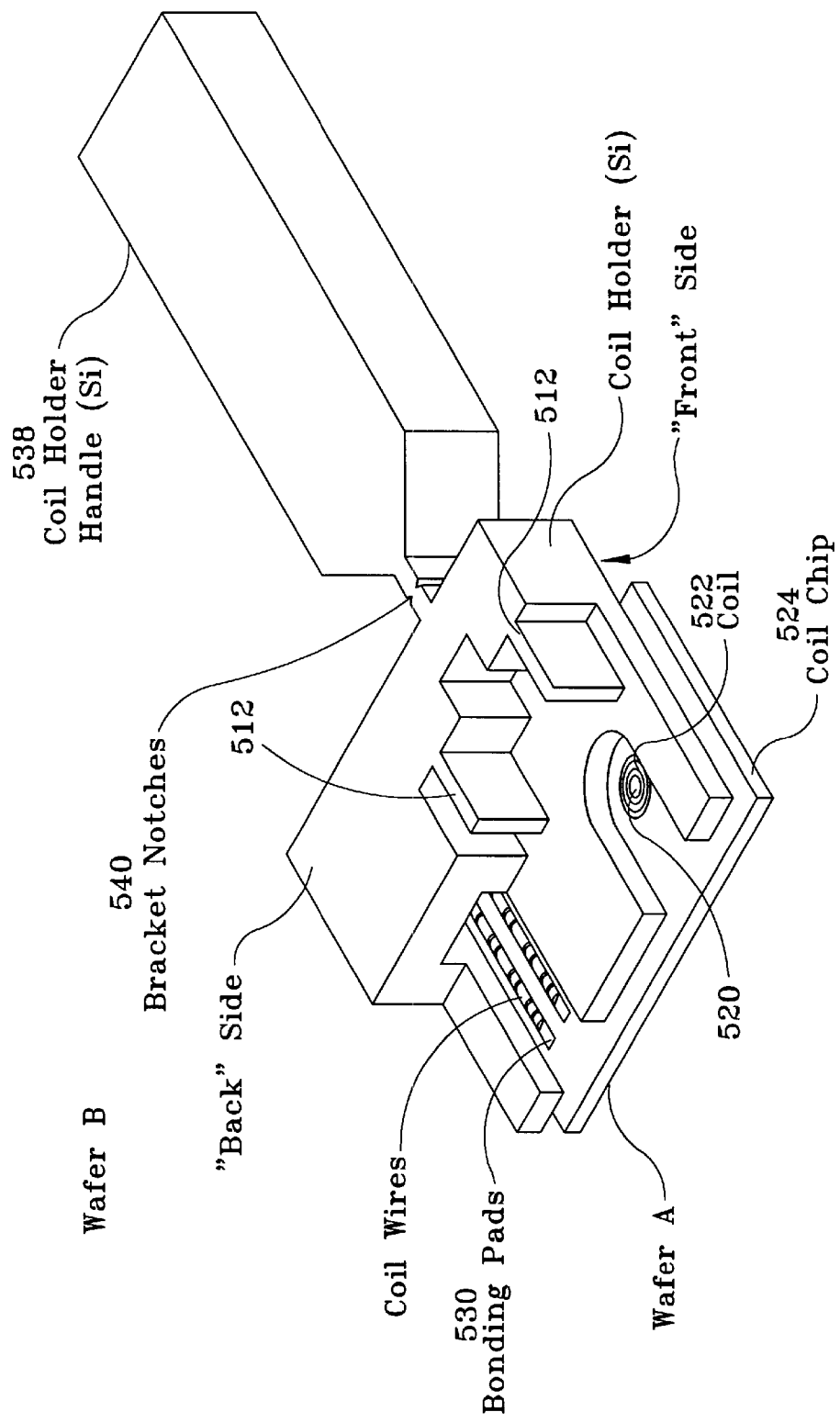
FIG. 6 is a more detailed view of a part of the disk assembly of FIG. 5 showing how the head is fabricated from a semiconductor such as silicon in accordance with the invention.

Referring specifically to the features which appear in the design shown in perspective in FIG. 6, an etching step forms the region 730 where the coils 710, 712 will be formed as well as the region 716 where the connection of the coils 710, 712 to the external environment are located. These comprise the bonding pads 530 shown generally in FIG. 6 as well as the coil array 522 of FIG. 6. It is important to recess these bonding pads and coils so that a flat surface is presented on the front of wafer A to be bonded to the front of wafer B. After the features are etched, then a layer 734 of silicon-rich silicon nitride is laid down over the exposed surface. [One of the reasons for choosing this material is that it has a refractive index of a little over 2 and therefore this layer can also be used as the window material at opening 714 through the center of the coils 522. This material is a quarter wavelength material with a relatively low refraction index. The most convenient material to use for the window will of course be silicon dioxide.] This invention is not limited to the use of either of the two materials suggested above but rather to any material which can be incorporated in the process and includes a relatively low index of refraction.

For example the silicon dioxide just mentioned will have a refractive index of about 1.45. As with the other layers, a quarter wavelength layer of the material is used equal to about 1,000 Å. The quarter wavelength dimension is of course related to the wavelength of interest which in this inst is red light from a laser source. That is, this layer is capable of reducing reflections by a factor of 10.

A fbrther alternative material for the window 714 could be alumina which is the same material that would be utilized for the conductive coils 522 and has a refractive index of about 1.65. While these coatings and their capabilities to a certain extent are well known in the optics field, the key feature in selecting a specific one would be its ability to be incorporated in the process described herein and survive the rigors of the process without losing its qualities and characteristics. At this time it appears that the optimum coating would comprise a very thin coating of silicon nitride and a coating over that of silicon dioxide. In fact, in a typical process the layer 734 would comprise oxide, nitride, aluminum nitride and oxide all laid down in a succession to form what is shown here as a single layer 734.

This step would be followed by depositing the two layers of coils 710, 712 and [gluing them together (while also] insulating them[)] using a material 740 such as photoresist. The wafer is then backlapped and polished, and etched to free the window. It can be seen that using standard processing techniques the bonding pads 530 are simultaneously formed with a conductive layer 750 being deposited over the surface of the copper layers. The design of this wafer 1A thus includes a number of useful features. The wafer provides mechanical support in a thermal conduction path for the heat generated by the coil during writing, as well as access for bonding wires leading to the coil chip. The provision of the window 714 provides clearance for the molded lens 760 and optical access to the center of the coil. Although not shown in this figsure, alignment fingers for adhesive attachment to the similar lens holder, and a handle for holding the part during assembly and especially for use in combination with the adhesive tape for handling the wafer, are provided, together with a notch 540 (see FIG. 6 for controllably breaking off the handle after assembly are provided.

In FIG. 7B is shown an embodiment of process steps of the invention in step 728. A wafer B is patterned in step 721 such as by applying a photoresistive material, exposing a pattern from a mask on the photoresist to transfer the pattern to the wafer B and hardening the photo resist such as by baking it.

Next, material is removed from the wafer B, such as by deep reactive ion etching in step 723. The opposite side of the wafer B is patterned in step 725 and etched in step 727 in the same way as in step 723, whereby the pattern is etched completely through the wafer.

A wafer A is then patterned and an etched in step 752 to form surface tubs for bonding and for coils, using a similar process to that used for wafer B above. Dielectric layers are then formed, such as by depositing a material such as glass on the wafer in step 753. One form of depositing dielectrics is by chemical vapor deposition (CVD).

Next, the coil layers are formed in step 755 by depositing a material such as copper (Cu) with, for example, plating. Once again, patterns, this time defining the coil layers or insulation for the coil layers, are transferred to the wafers, and excess material is etched away. These steps forming the coil layers and the coil insulation may be repeated to provide the needed material.

The coil layers may be capped by a magnetic return layer in step 757, which is formed and patterned as described before.

A carrier, such as a heat release type may be attached as in step 729, and the wafer may be diced and the die separated as in step 759.

The die may then be released for assembly and bond wires and packaging added as required to complete the process.

Figure 8A:
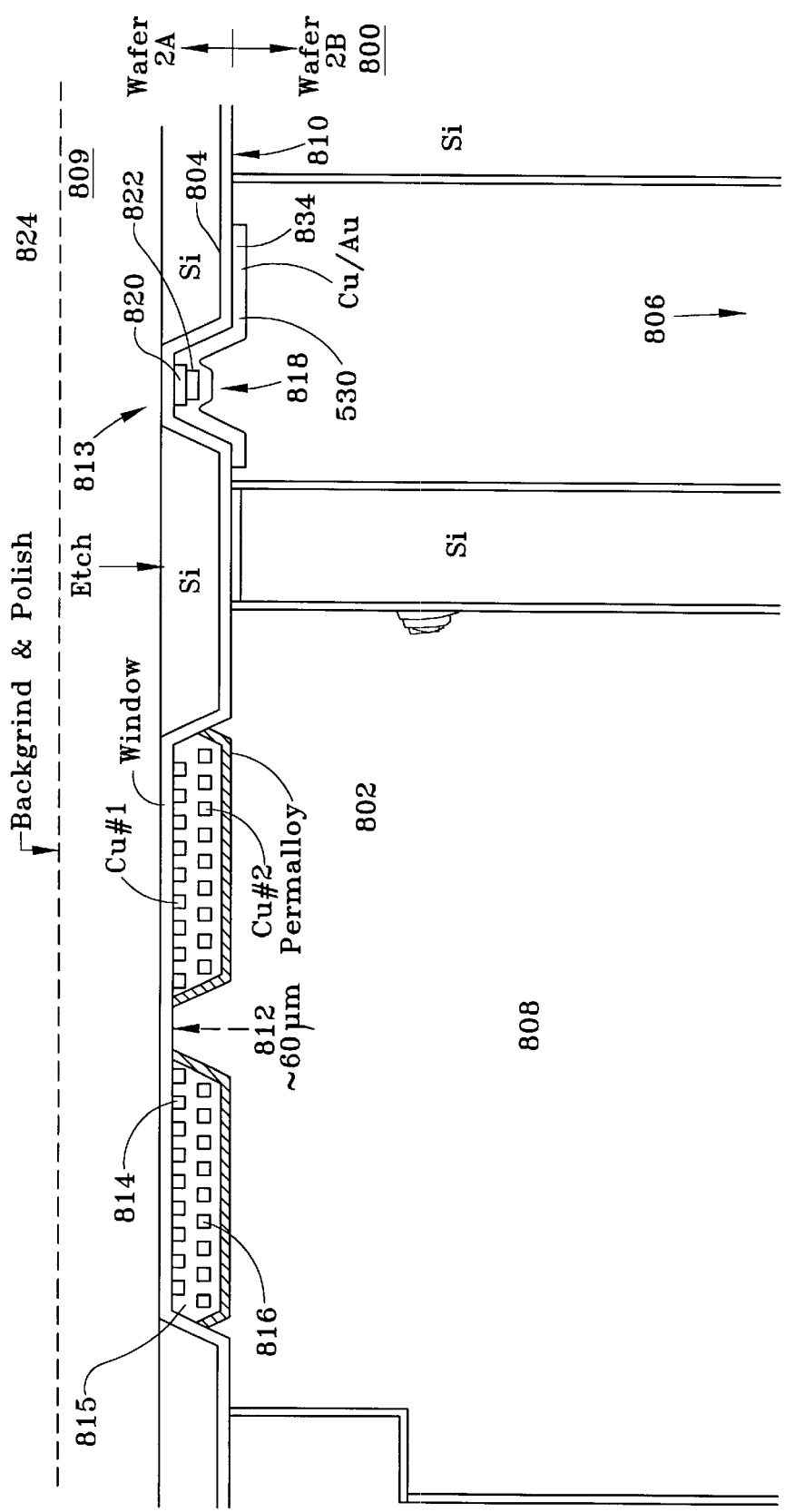
FIG. 8A is another detailed view of a part in accordance with FIG. 7A frther illustrating how a coil, lens holder, and feedthrough of the invention may be realized.

FIG. 8 illustrates a variation on the embodiment of FIG. 7A, in which a GRIN lens is supported; therefore, the dimensions which are stated are for the GRIN lens but the invention is not limited to wafers of these particular dimensions.

The processing begins with the wafer 2B 800 which incorporates the lens holder 802 and is a mechanical support for the final device. A typical wafer 2B 800 could be in the range of about 250 $\mu$m thick, which is thick enough to handle if 100 mm in diameter, yet thin enough to etch through in a reasonable time with current DRIE (deep reactive ion etch) equipment. Typically, alignment marks would be provided on both sides of the wafer, using a known double sided mask aligner to facilitate later alignment of features on the front and back sides of each wafer and of the wafer assembly. As will be seen, many of the features are first etched from one side and then from the opposite side. Specifically, features are lithographically patterned on the front side, which is the side 804 which will be joined to the wafer 2A and DRIE etched to a depth of about 90 $\mu$m. Features are then lithographically patterned on the back side 806 of wafer 2B and DRUE etched to a depth necessary to meet the features etched from the front side. The general physical structure and process flow is substantially the same as shown in FIG. 7, except that a region 808 is etched out to allow for the use of a GRIN lens.

Wafer 2A is also started with front/back alignment marks. Relatively shallow holes are etched into one side 810 of the wafer 2A, 809 using an anisotropic etchant such as KOH and water. These holes 812 will act as depressions for the coils 814, 816 and as channels for the interconnect metal 818 which is deposited later in the processing. It can be seen that both of the layers of coils 814, 816 have leads 820, 822 which extend into this channel so that the interconnect metal can be deposited to provide external connections. A set of dielectric layers 814 are then deposited on the surface of the wafer 2A over both the etched and non-etched regions; these layers will act or serve as the window 812 in the region between the coils 814, 816. The layers are deposited by E-beam evaporation, sputtering, or PECVD deposition. The layers must be mechanically strong and optically transparent in order to provide this window function. In order to reduce optical reflections from the incident surfaces, antireflection coatings need to be incorporated. A preferred stack (see FIG. 8B) includes a ¼ wavelength thick coating of silicon dioxide 850 with an index of refraction of about 1.45; a 1 $\mu$m thick layer of silicon rich silicon nitride 852 with a refractive index of about 2.10, and another ¼ wavelength coating of silicon dioxide 854 with the three together forming the layer 824.

The ¼ wavelength coatings act as antireflection layers for the nitride layer, which in turn provides the mechanical strength to the subsequently formed membrane 824.

The copper coil layer 814 surrounds and defines the window region. This copper layer 814 provides a layer of the coil as well as the electrical connection running to the bonding pads 530 at the bonding pad region of this design 813. An intermetal dielectric 815 is deposited to insulate the next coil layer 816 from the first coil. This dielectric is typically a patterned photoresist layer which is baked to provide adequate mechanical and electrical performance. The dielectric could be, for example, silicon dioxide or silicon nitride. As further shown, as many coil layers as desired can be needed, each ending in a further bonding contact 822 at the bonding pad region 530. Each addition layer is, of course, insulated from the next.

Permalloy is now selectively plated in FIG. 7B 757 over this central coil region 522 of the wafer. This layer will provide a magnetic return for the coil structure 814, 816. The region is preferably between 1 and 2 $\mu$m thick, which is thick enough to provide adequate magnetic performance. In the adjacent region 818 where the bonding pads are located, a highly conductive gold layer 834 is now selectively plated using photoresist to define the pads in FIG. 6 530 over the entire anisotropically etched hole.

The two wafers 2A 800 and 2B 809 are then aligned and assembled in FIG. 7B 759 using an adhesive bonding process using either sheet epoxy, screen printed adhesive or adhesive wicked into the thin gap between the two wafers. The wafer assembly is mechanically ground and polished from the side of the wafer opposite to where the deposition occurred until a membrane thickness of about 30 $\mu$m is obtained.

This front surface is further etched using, for example, KOH and water or a plasma etchant such as SF6 until the window region 812 is clear.

Figure 8B:
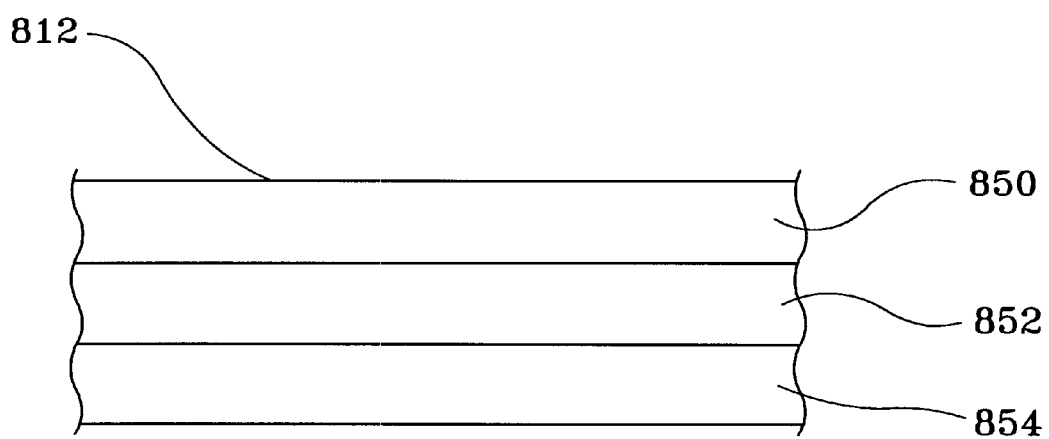
FIG. 8B is a detail of a construction of the optical window of the invention.

The dielectric layers of an embodiment of the invention in FIG. 8B 824 demonstrates how an antireflective (AR) layer 850 and an AR layer 854 sandwich a window layer 852. The two AR layers are often comprised of silicon dioxide, with the window layer being a material with a refractive index which is the square of the refractive index of the AR layers, for example, silicon rich silicon nitride with a refractive index of substantially 2.1, versus silicon dioxide with a refractive index of substantially 1.45.

Figure 9A:
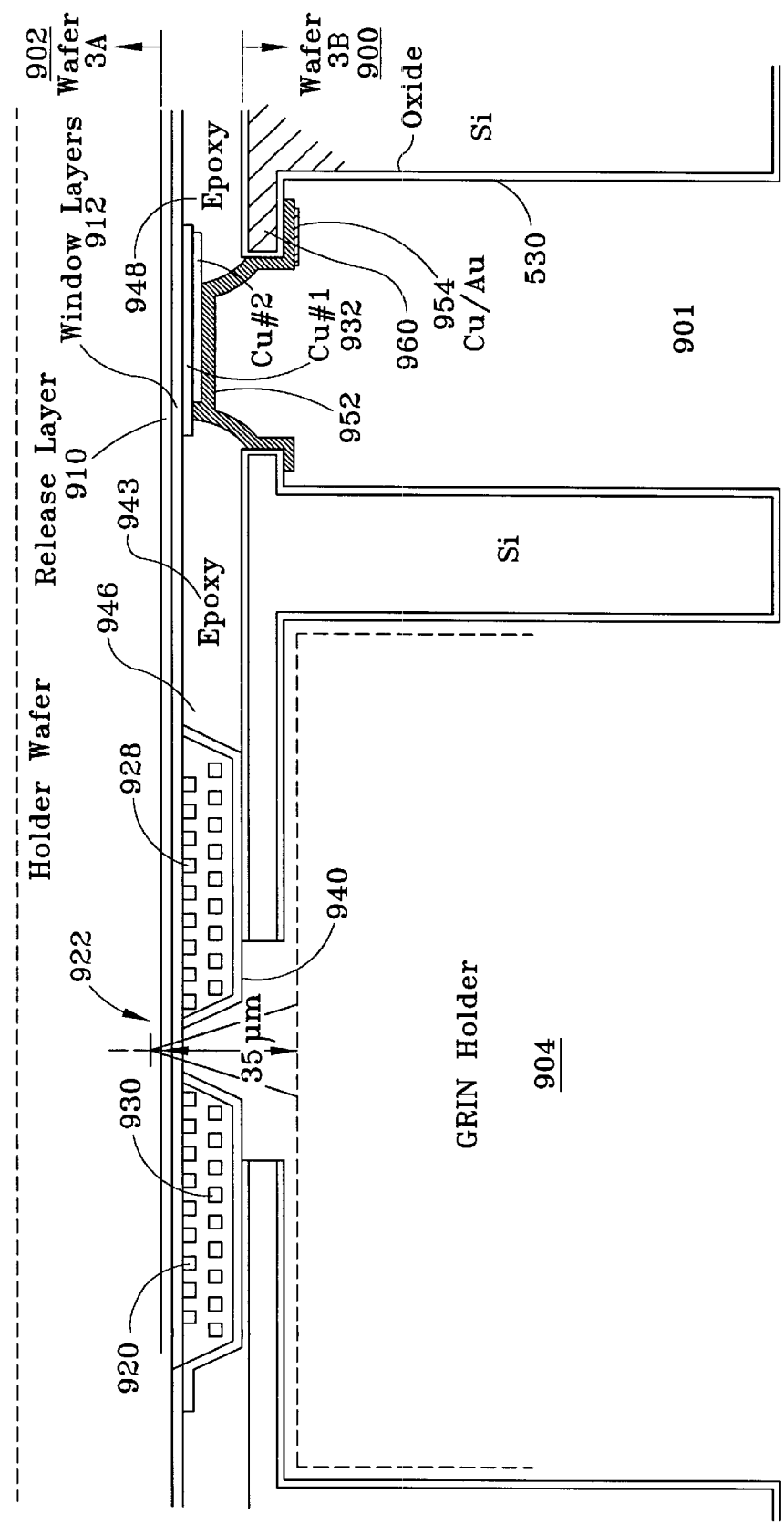
FIG. 9A is another detail of a construction of a coil, lens holder, and feedthrough of the invention.

In FIG. 9A an embodiment of the invention involving a release layer for the wafer is shown. The metallic release layer 910 will be etched away near the end of the process to transfer the coil trrnsfer to the final assembly which comprises wafer 3A 902 and wafer 3B 900. Metals such as Al or Ti, about 1 $\mu$m thick, are typically used for this layer 910. A set of dielectric layers 912 are deposited over the release layer 910; they must be mechanically strong and optically transparent. Preferably they are deposited by E-beam evaporation, sputtering, or PECVD deposition, although other equivalent processes may be used. In order to reduce optical reflections from the incident surfaces, antireflection coatings need to be incorporated in this layer 912. A preferred stack for layer 912 includes at least a ¼ wavelength thick coating of silicon dioxide with an index of refraction of about 1.45; a 1 $\mu$m thick layer of silicon rich silicon nitride with a refractive index of about 2.10, and another ¼ wavelength coating of silicon dioxide. The ¼ wavelength coatings act as anti-reflection layers for the nitride layer, which provides the mechanical strength to the formed membrane 912. The window layer (an example appears in FIG. 8B) is selectively etched in regions (not shown) on the periphery of the devices to allow etching of the sacrificial layer 910 later in the process.

The first Cu coil layer 920 is then selectively plated on the dielectric window layer 912. This Cu layer 920 provides one layer of the coil surrounding window 922, the electrical connection from the coil to the feedthrough region 530 in FIG. 6, and part of the electrical cross-over to layer 952 on wafer 3B. If additional coil layers 928 are desired, as shown in the cross-section, additional dielectric layers 930 can be deposited and contact 932 formed to the first coil layer. Cu can be selectively plated above the first coil, forming additional turns 928 for a coil structure, as is commonly done to make thin film inductive data storage heads. An intermetal dielectric 930 is deposited to insulate the coil layers from the plated metal. Permalloy 940 is now selectively plated around the central coil region ofthe device. This layer 940 will provide a magnetic return for the coil structure. The permalloy 940 is preferably between 1 and 2 μm thick. The wafers 900, 902 are now formed together by placing them facing each other, using the alignment marks previously described. Open regions 946, 948 adjacent the coils 920, 928 and bonding pads 954 are filled with epoxy 943 to hold the wafers in alignment as well as establish mechanical strength for the completed units.

A Cu layer 952 is now selectively plated from the backside of the wafer assembly, through feedthrough 530, using for example, a deposited plating base, a sprayed-on layer of photoresist, and lithographic exposure. The layer 952 provides a connection from the access through-hole 906 of wafer 3B to the connecting bonding pads 932 which will provide current to coils 920, 928. An optional layer of Au 954 can be plated as the final layer as an aid for wire bonding in the final device. The window layer 912 and the plated Cu 952 act as the thin support for this plated metal, so that a "diaphragm" of plated Cu spans the feedthrough 530 and extends up onto the silicon platform 960 on wafer 3B 900.

The metallic release layer 910 is then etched away using an etchant selective to that metal layer. This release is done through holes (not shown) provided through the wafer. The resulting wafer of devices can be diced to provide numerous individual coil devices from the processed wafer assembly. The coil devices can then be adhesively attached to a conventional ceramic slider.

Figure 9B:
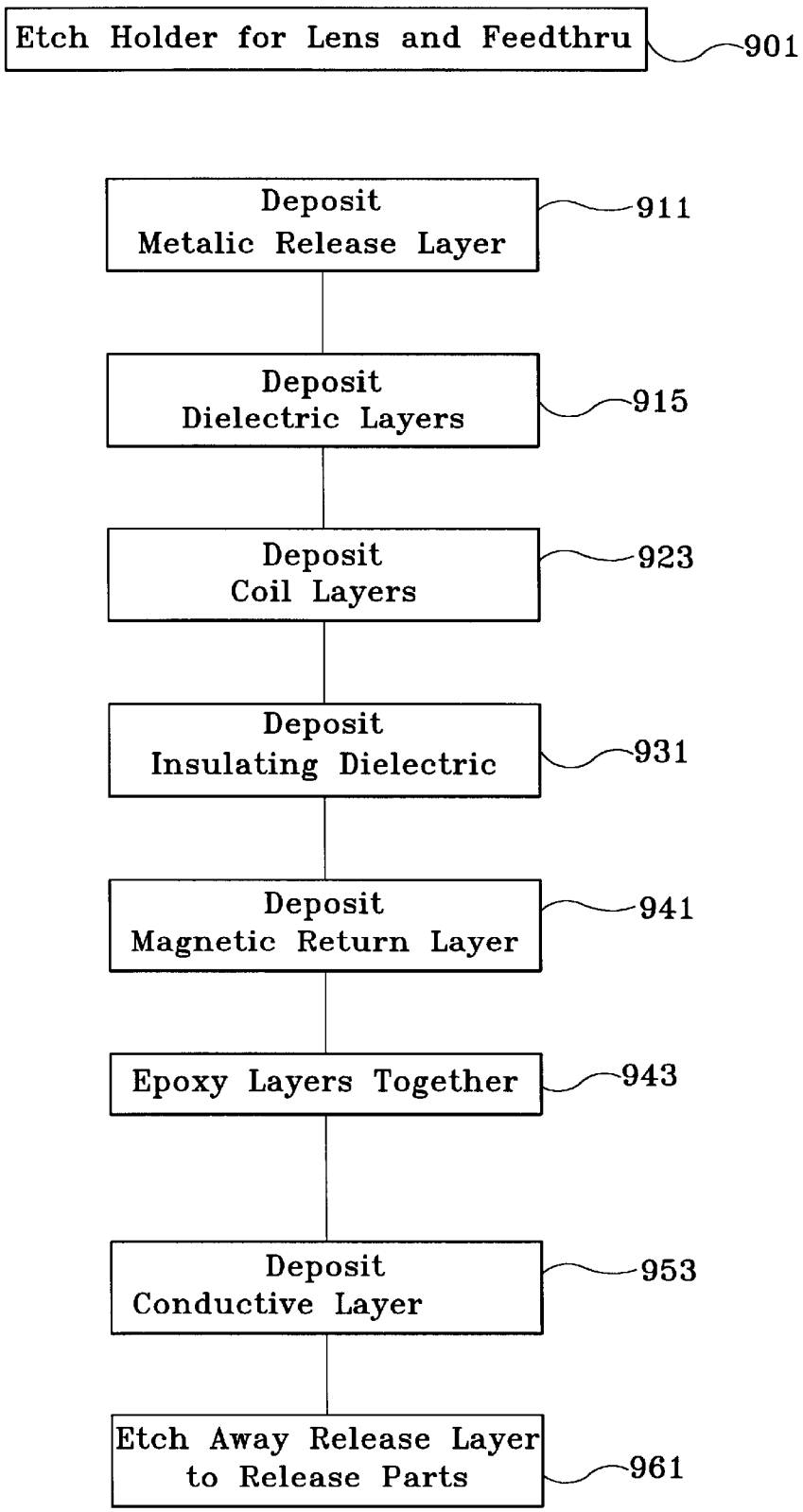
FIG. 9B is a flow chart relating details of construction to an embodiment of the invention as in FIG. 9A.

In FIG. 9B an embodiment of the process for realizing the lens holder and coil assembly of the invention. A wafer B is etched 901, to produce a lens holder and an electrical feedthrough using the process disclosed before involving photolithography, or using direct application of an etchant such as DRIE, discussed above. A metallic release layer is added by step 911 such as by depositing it with E-Beam or sputtering, and patterned, if desired, as disclosed before. A dielectric layer 915 is then placed over the release layer 911 and patterned to allow access to the release layer.

In wafer A, the silicon etch, dielectric layers, copper layers, and feedthrough necessary to form the coil step 923 are performed as disclosed before, and an insulating dielectric 931 provided for the magnetic return layer step 941 to be added. After polishing and other "wafer prep" operations wafer A and wafer B are joined, such as by epoxy bonding. Conductors are then added as desired, with optionally more dielectric layers, and the release layers are etched away or otherwise removed to release the parts.

Figure 10A:
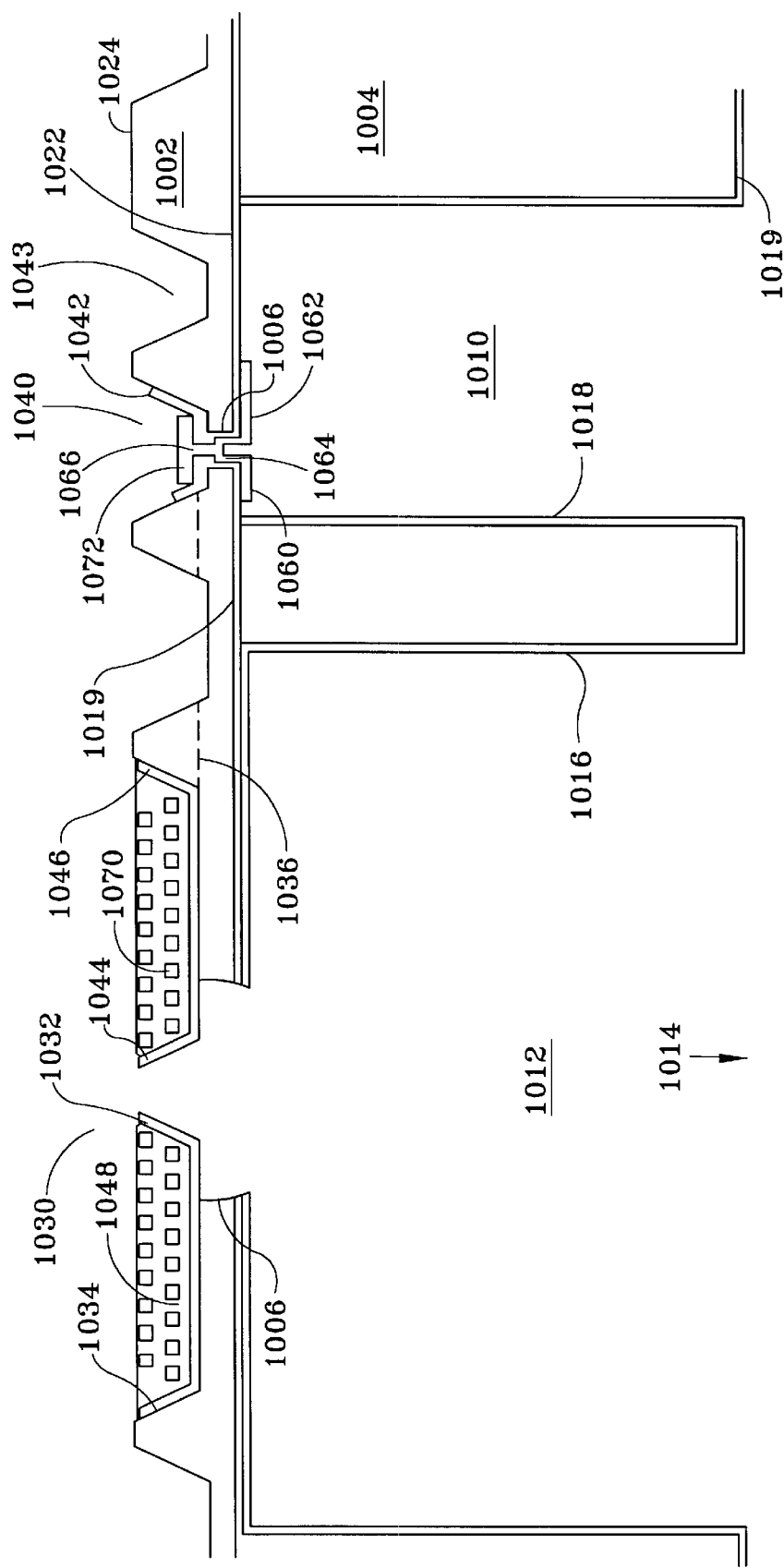
FIG. 10A is a detailed view of the construction of the coil, lens holder, and feedthrough of the invention.
Figure 10B:
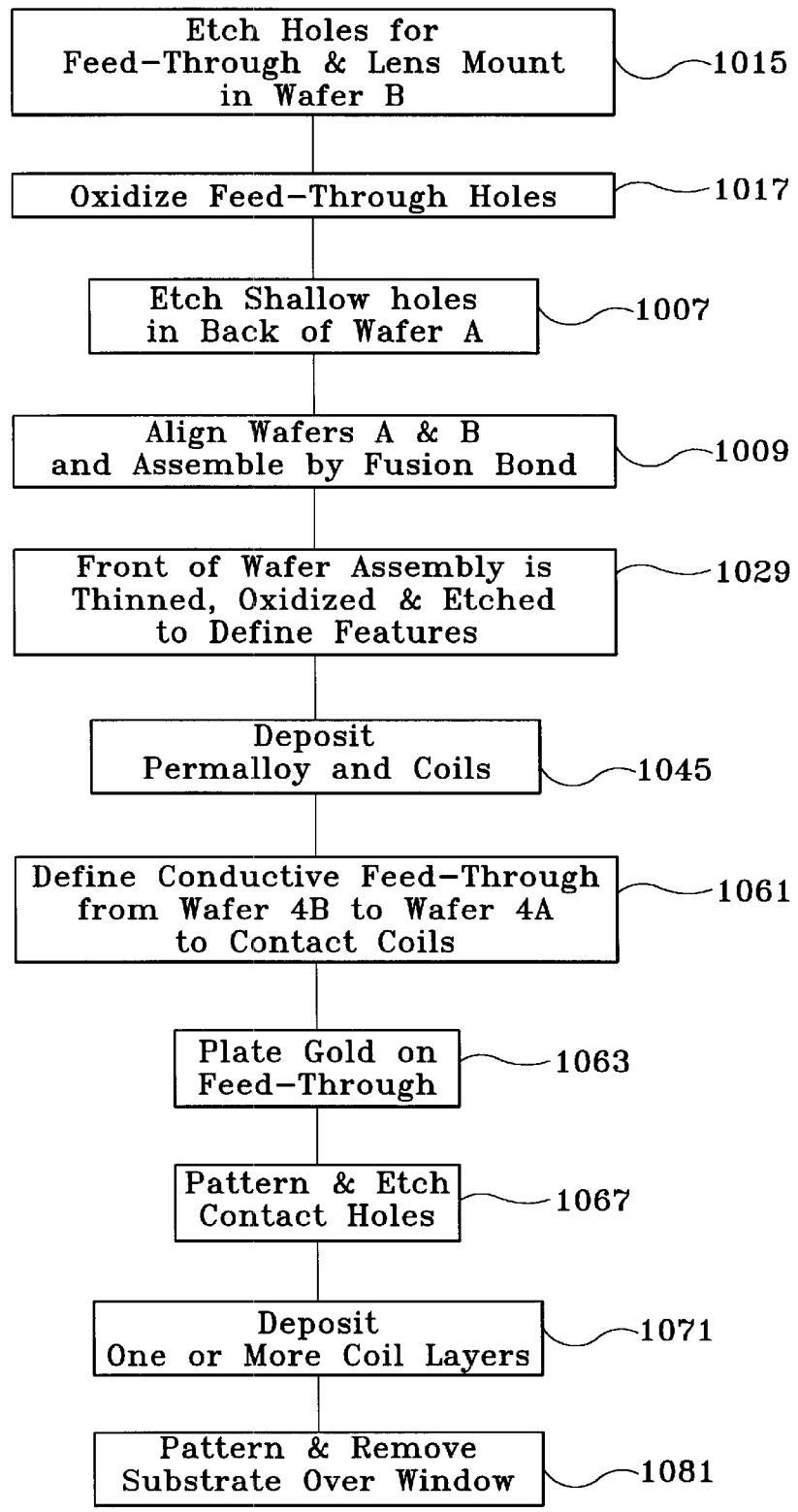
FIG. 10B is a flow chart relating details of construction to an embodiment of the invention as in FIG. 10A.

The next example shown in FIGS. 10A and 10B comprises forming devices from [of] two wafers by fusion bonding, with wafer 4B 1004 having feedthrough openings 1010 to the electrical contacts as well as a support region 1012 for the lens. The dimensions will be described for the GRIN lens variant, however the process for a molded lens is very similar and the differences will be described later.

The processing begins with Wafer 4B 1004 which will act as the lens holder and mechanical support for the final device. Wafer 4B 1004, could be in the range of 250 μm thick, which is thick enough to handle if 100 mm in diameter, yet thin enough to etch through in a reasonable time with current DRIE equipment. Typically alignment marks would be provided on both sides of the wafer 4B 1004 to facilitate later alignment of features on front and back sides of each wafer and of the wafer assembly. Features i1012, 1010 are lithographically patterned on the "back" side 1014 of Wafer 4B and DRIE etched through the wafer. The wafer is then cleaned and a thermal oxide 1016, 1018 grown, typically 1 μm thick, which will provide electrical isolation to the interconnect metal in the final device.

Wafer 4A 1002 (which appears in the upper half of FIG. 10) is started with front/back alignment marks. Relatively shallow DRIE holes 1006 are etched from the "back" side 1019 of Wafer 4A to a depth of about 20 μm. These holes will act as electrical feedthrough holes 1006 for the interconnect metal later in the processing. Wafer 4A is then oxidized 1022, again to a thickness of about 1 μm.

Wafers 4A 1002 and 4B 1004 are then aligned and assembled using the so-called fusion bonding process, using commercial equipment designed for this purpose. The wafer assembly is then mechanically ground and polished from the "front" side 1024 of Wafer 4A until a membrane thickness of about 30 μm is obtained. The thinned wafer assembly can now be oxidized to a thickness of about 300nm to provide an etch mask for the following etching step. An anisotropic silicon etch, such as KOH and water or a reactive ion etch (RIE) is then used to etch to a depth of about 10 μm, with appropriate corner compensation, if the KOH etch is used, to provide four sets of features on the front side of the thinned wafer assembly. One of these features is a central mesa 1030 with sloping sides 1032 which will be the center of the coil and which will form the outside diameter of the coil. Another is channels 1036 which are defined to allow the coil connections to extend to the feedthrough region. The final features are recesses 1040 over the feedthrough holes to define the air bearing surfaces (ABS) of the flying head. The backside thermally grown oxide 1022 is exposed in the feedthrough hole region 1040, forming a thin membrane in this region. The top oxide etch mask is then stripped while protecting the insulated oxide and membrane in the feedthrough regions. The etched wafer assembly can now be optionally oxidized (shown 1042 as limited to recess 1040), to provide electrical isolation between the substrate and the next plated Cu layer 1072.

Permalloy 1044 is now selectively plated around the central coil region of the device. This layer will provide a magnetic return for the coil structure. This region is preferably between 1 and 2 μm thick, which is thick enough to provide adequate magnetic performance. An intermetal dielectric 1048 is deposited to insulate the later coil layers from the plated metal 1044 and the silicon substrate 1002. This dielectric 1048 is typically a patterned photoresist layer which is baked to provide adequate mechanical and electrical performance. Alternate dielectric layers can be deposited and patterned, such as silicon dioxide or silicon nitride. A Cu layer 1060 is now selectively plated from the back side 1019 of the wafer 4A 1002, using, for example, a deposited plating base, a sprayed-on layer of photoresist, and lithographic exposure. An optional layer of Au 1062 can be plated as the final layer as an aid for wire bonding in the final device. Only one feedthrough and bond pad combination is shown another will be needed, since there are two coil connections. The last dielectric layer 1048 and the oxide membrane 1042 acts as a thin support for this plated metal, so that a "diaphragm" of plated Cu 1064 spans the feedthrough region. A "contact hole" 1066 is then patterned and etched from the front surface 1024 of the wafer assembly to allow electrical connection between the front metal layers and the back metal layers, forming the feedthrough.

The first Cu coil layer 1070 is then selectively plated on the dielectric layer 1048 and the contact holes. This Cu layer provides one layer of the coil, the electrical connection from the coil to the feedthrough region, and one half 1072 of the electrical feedthrough 1064. If additional coil layers are desired, as shown in the cross section, additional dielectric layers 1048 can be deposited and contacts formed to the first coil layer, and Cu can be selectively plated above the first coil, forming additional turns for the coil structure, as is commonly done to make thin film inductive data storage heads.

After the coil structure is completed, the region interior 1080 to the coil is patterned and an isotropic silicon etchant, such as an SF6 plasma, is used to remove the silicon substrate 1002 below the center of the coil. The plated Permalloy 1032 on the former mesa sidewalls acts as an etch mask for this plasma etch, protecting the inner turns of the coil structure. The remaining oxide membrane 1022 below the mesa on the former backside 1019 of Wafer 4A can then be removed by selective wet etching, effectively opening a window between the coils 1070.

The resulting wafer of devices can be diced to provide numerous individual coil devices from the processed wafer assembly. The coil devices can then be adhesively attached to a conventional ceramic slider.

An alternative product comprises a GRIN lens part, fusion bonded wafers, plated through feedthroughs, no window, and integrated slider features. This allows ABS features to be incorporated into a monolithic head, a singularly important feature of the invention whereby exact alignment of the ABS features is assured.

It is immediately apparent that this is similar to the process for FIG. 10, with the addition of etched channels 1043 on the front surface of Wafer 4A to define ABS features, and during the sawing of the chips, 45 degree features are ground into the slider to allow attachment of separate mirror chips, and grooves are sawn into the back side of Wafer 4B to act as fiber slots. Dielectric layers can be deposited on the back surface of Wafer 4B to control the curvature of the parts to provide a controlled profile for flying.

In FIG. 10B an embodiment of the invention comprising process steps for realizing the lens holder and coil assembly.

Holes are etched in a wafer B step 1015 as disclosed before, and oxidized step 1017 as disclosed.

Contact holes in wafer step A 1007 are formed, and the wafers A & B are aligned and fusion bonded together step 1009.

Areas defining the coil assembly and feedthrough connections step 1029 are formed on the front of wafer A.

Conductive feedthroughs and coil contacts are defined step 1061, and gold is optionally plated on the feedthrough in step 1063.

Contact holes are defined and formed in step 1067, and the coil, which includes a permalloy shield as previously disclosed is formed in step 1071.

The substrate is then removed in the window area defined in the center of the coil.

After this, the die are prepared for assembly, separated and assembled as before.

Figure 11A:
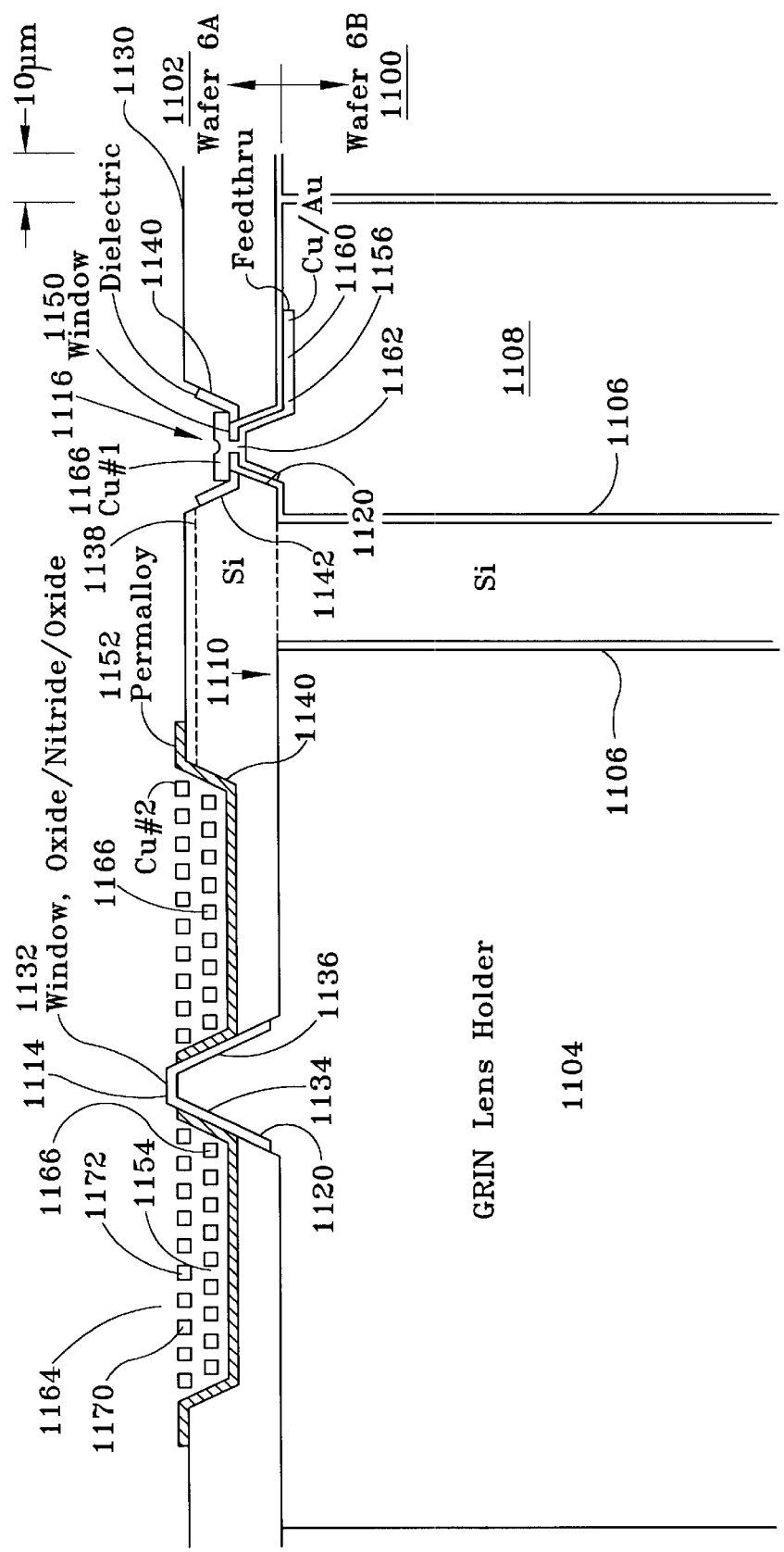
FIG. 11A is another detailed view of the construction of the coil, lens holder, and feedthrough of the invention.
Figure 11B:
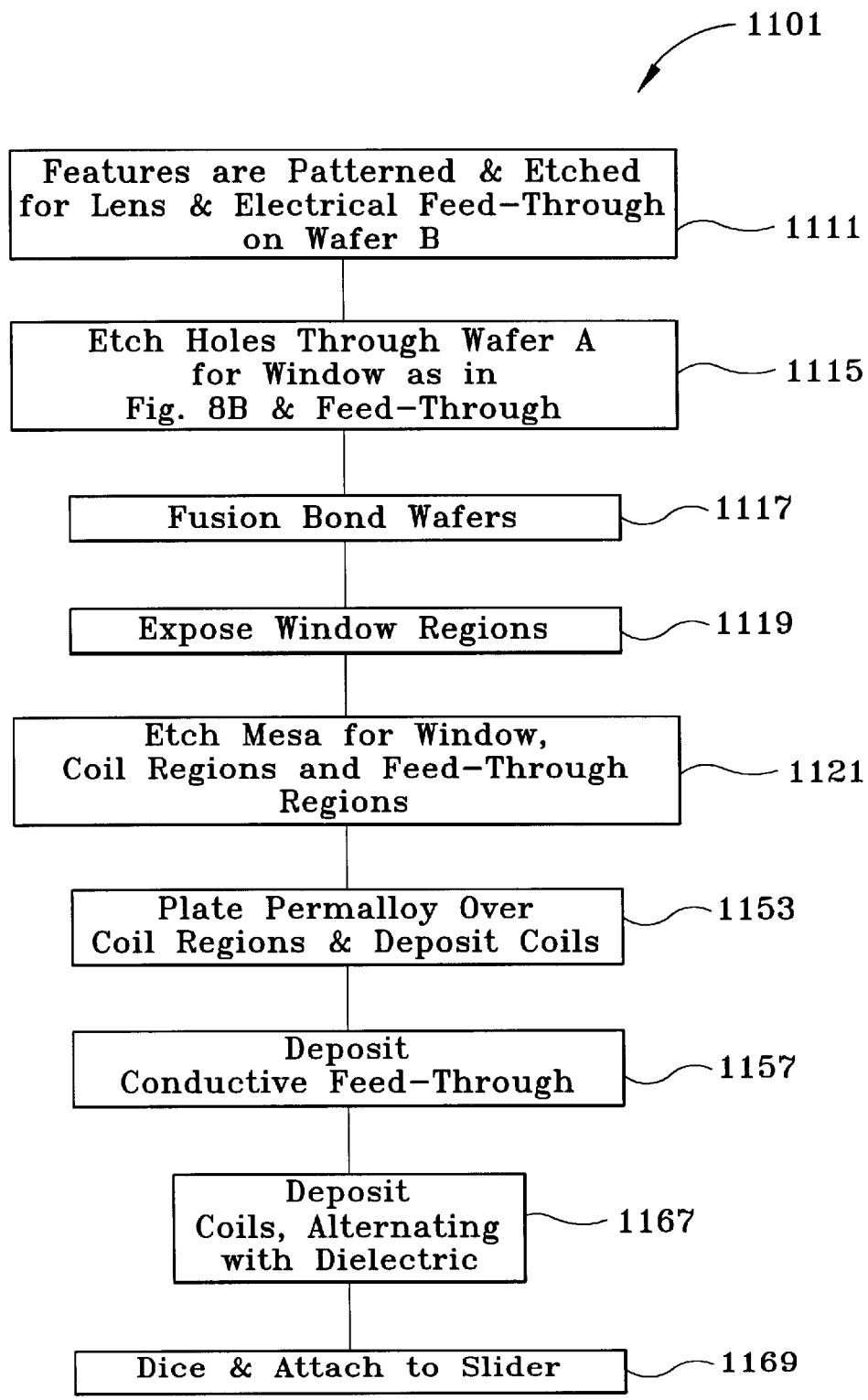
FIG. 11B is a flow chart relating details of construction to an embodiment of the invention as in FIG. 11A.

The next embodiment of FIG. 11A and 11B comprises a GRIN lens part, fusion bonded wafers, plated through feedthroughs, with window.

The process starts with two silicon wafers, 6A and 6B, numbered 1102, 1100, respectively The dimensions will be described for the GRIN lens variant; however, the process for a molded lens is very similar.

The processing begins with Wafer 6B 1100, which will act as the lens holder and mechanical support for the final device. Wafer 6B 1100 could be in the range of 250 $\mu$m thick, which is thick enough to handle if 100 mm in diameter, yet thin enough to etch through in a reasonable time with current DRIE equipment. Alignment marks are provided on both sides of the wafer to facilitate later alignment of features on front and back sides of each wafer and of the wafer assembly. Features to hold the GRIN lens 1104 and to provide electrical feedthrough 1108 are lithographically patterned on the "back" side of Wafer 6B 1100 and DRIE etched through the wafer. The wafer is then cleaned and a thermal oxide 1106 grown over the features, typically 1 $\mu$m thick.

Wafer 6A 1102 is started with front/back alignment marks. Two sets of anisotropically etched holes are etched from the "back" side 1110 of wafer 6A 1102 one to a depth of 30 $\mu$m for the window feature 1114 and the others to a depth of about 20 $\mu$m for the feedthrough 1108. A set of dielectric layers 1120 are deposited on the back of Wafer 6A 1100 to act both as electrical insulation for the feedthroughs, and as the optical window. These layers can be deposited by, for example, e-beam evaporation, sputtering, or by LPCVD deposition. The layers must be mechanically strong and optically transparent. In order to reduce optical reflections from the incident surfaces, anti-reflection coatings need to be incorporated. One embodiment includes a ¼ wavelength thick coating of silicon dioxide, with an index of refraction of about 1.45, a 1 $\mu$m thick layer of silicon-rich silicon nitride, with a refractive index of about 2.10, and another ¼ wavelength coating of silicon dioxide. The ¼ wavelength coatings act as anti-reflection layers for the nitride layer, which provides the mechanical strength to the subsequently formed membrane. Except for the window 1114 and feedthrough 1108, the set of layers are selectively etched back to the first ¼ wavelength oxide coating, which will be used for fusion bonding.

Wafers 6A and 6B are then aligned and fission bonded. The wafer assembly is then mechanically ground and polished from the "front" side 1130 of Wafer 6A 1102, until a membrane thickness of about 50 $\mu$m is obtained. This assembly is further etched, using for example, KOH and water at 50 degrees C., until the window regions are just exposed. A metallic etch mask of, for example, 20 nm of Cr and 200 nm of Au is deposited and patterned. An anisotropic silicon etch, such as KOH and water, is then used to etch to a depth of about 10 $\mu$m, with appropriate corner compensation, to provide three sets of features on the front side of the thinned wafer assembly; a central mesa 1132 of window material 1120 with sloping sides 1134 which will be the center of the coil, channels 1138 to allow the coil connections to extend to the feedthrough 1108, and recesses 1140, with sloping walls 1142 over the feedthrough to connect to the backside of the wafer assembly. The backside window material is exposed in the feedthrough 1108, forming a thin membrane 1150 in this region. The top etch mask (not shown in FIG. 11) is then stripped which does not harm the window or window membrane in the feedthrough regions.

Permalloy 1152 is now selectively plated from the back side around the central coil region of the device, extending up the sidewalls 1136 on both sides of the recesses 1164 that form the coil region. This layer 1152 of Permalloy will provide a magnetic return for the coil structure. The permalloy layer 1152 is preferably between 1 and 2 $\mu$m thick. An intermetal dielectric 1154 is next deposited to insulate the later coil layers from the plated metal 1152 and the silicon substrate 1102. A Cu layer 1156 is now selectively plated from the back side of the wafer assembly, using, for example, a deposited plating base, a sprayed-on layer of photoresist, and lithographic exposure to establish the conductive feedthrough.

An optional layer of Au 1160 can be plated as the final layer as an aid for wire bonding in the final device. The window layer 1150 and the oxide layer 1120 acts as the support for this plated metal 1160, so that a "diaphragm" of plated Cu spans the feedthrough region. A contact hole 1162 is then patterned and etched from the front surface of the wafer assembly to allow electrical connection between the front metal layers and the back metal layers, forming the feedthrough.

The first Cu coil layer 1166 is then selectively plated on the dielectric layer 1154 and the contact holes 1162. This Cu layer 1166 provides one layer of the coil, the electrical connection from the coil to the feedthrough region, and one half of the connection through electrical feedthrough 1162. If additional coil layers are desired, as shown, additional dielectric layers 1170 can be deposited and contacts formed to the first coil layer, and Cu can be selectively plated above the first coil, forming additional turns 1172 for the coil structure to make thin film inductive data storage heads.

The resulting wafer of devices can be diced to provide numerous individual coil devices from the processed wafer assembly. The coil devices can then be adhesively attached to a conventional ceramic slider.

FIG. 11B is a process flow chart representing an embodiment of the invention 1001. Stating with waferB 1100 the lens holder and the feedthroughs are formed using the photolithographic DRIE steps disclosed before in step 1111.

Continuing with wafer A 1002, the windows are formed in step 1115 as previously disclosed.

Then, in step 1117, the two wafers are fusion bonded together, and in step 1119 the windows formed in step 1115 are exposed by etching as previously disclosed.

A further step 1121 defines the window mesa, coil region, and feedthrough contact area, and in step 1153 a magnetic return material such as permalloy is formed such as by depositing the material. The coils are also formed, such as by depositing the material and defining it with photolithography and etching.

In step 1157 the conductive feedthroughs are defined, and in step 1167 additional coil layers, appropriately insulated with dielectric layers, are formed.

Last, in step 1169 the magneto optical heads are separated and assembled for use.

Figure 12A:
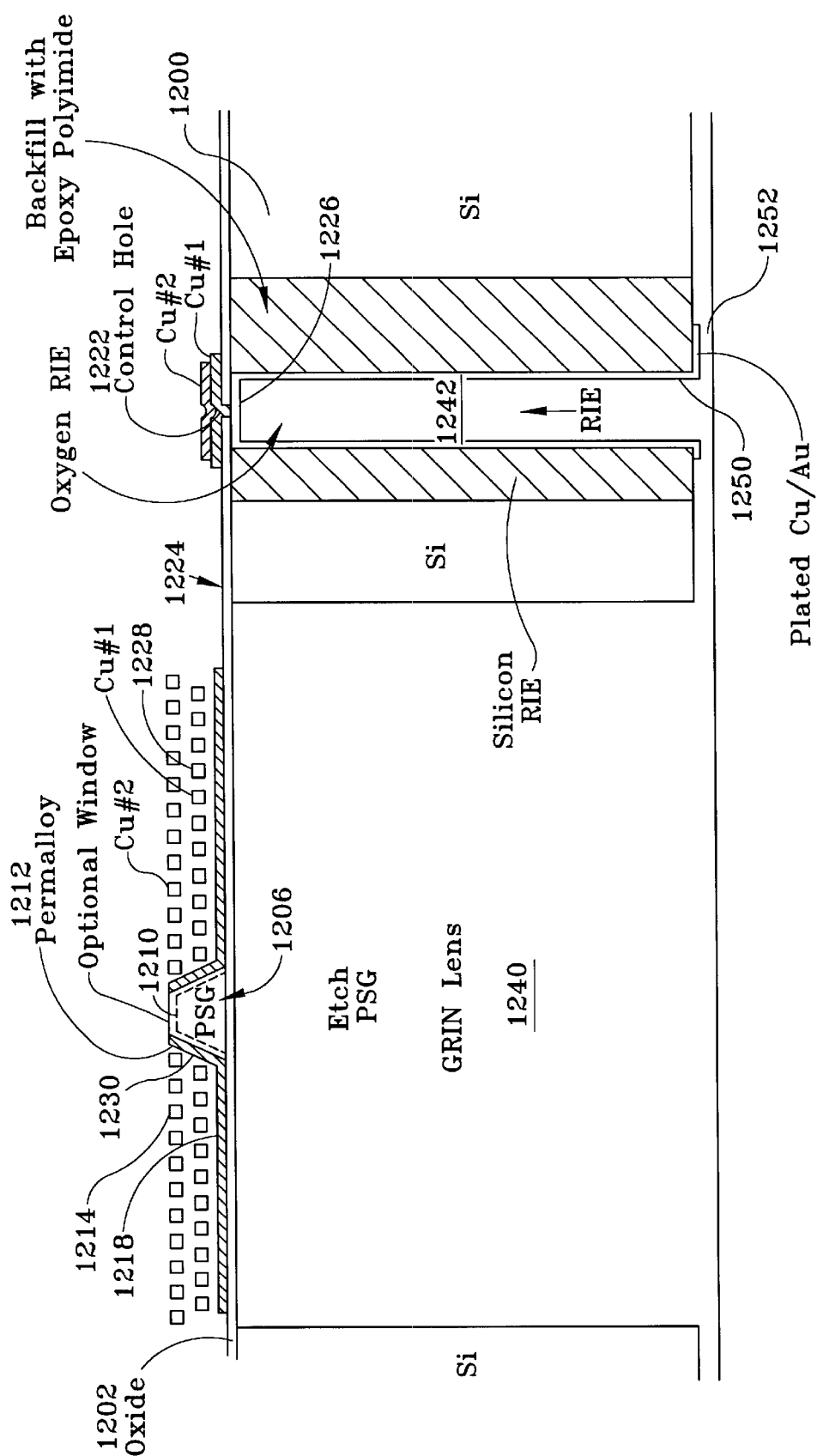
FIG. 12A is another detailed view of the construction of the coil, lens holder, and feedthrough of the invention in which only one wafer is required.
Figure 12B:
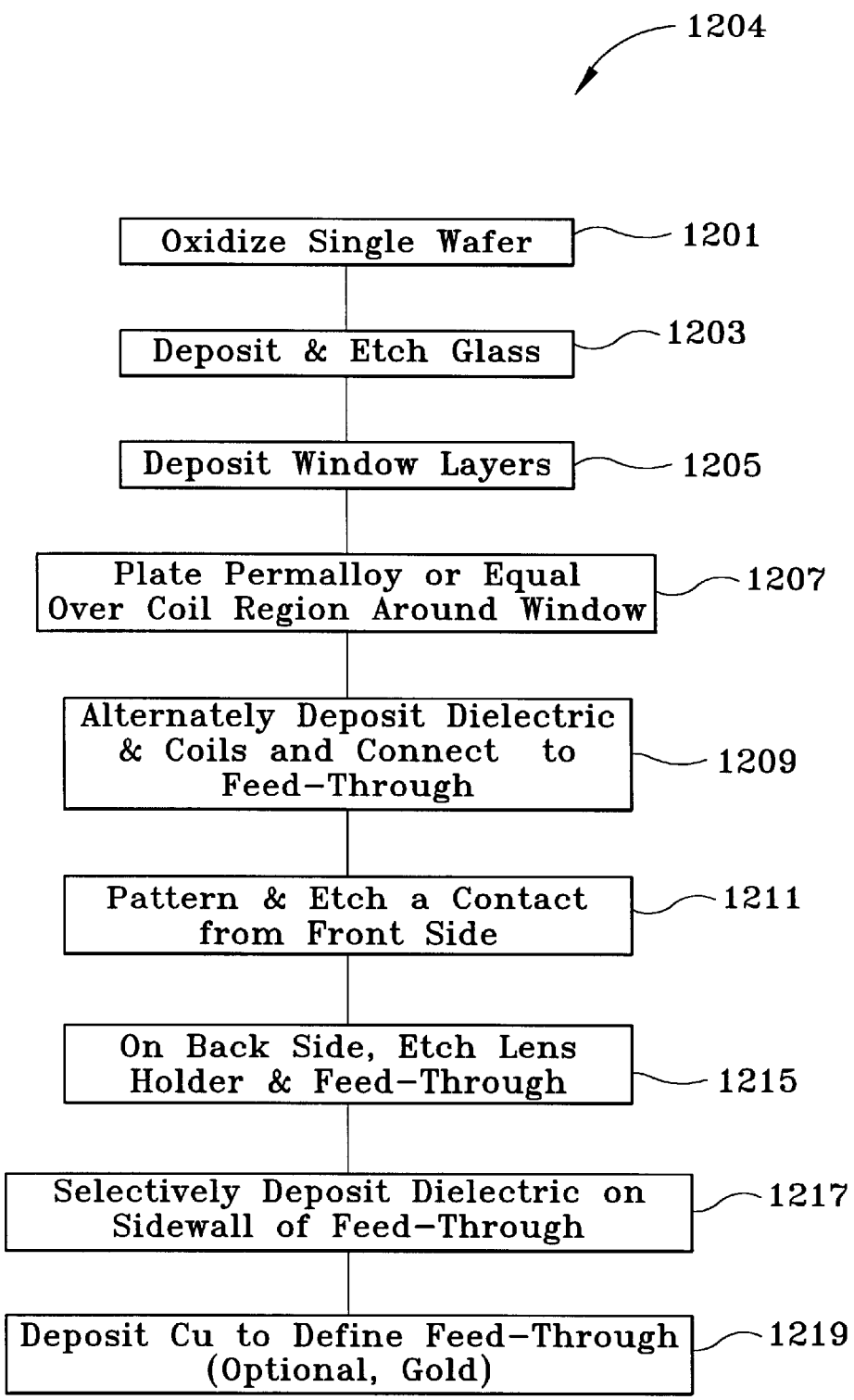
FIG. 12B is a flow chart relating details of construction to an embodiment of the invention as in FIG. 12A.

In a final example, FIGS. 12A and 12B show a GRIN lens holder defined in a single wafer, with plated through feedthrough, and with a window.

The following description and cross-sectional drawing are for an embodiment formed by a process starting with one silicon wafer 6C 1200.

Wafer 6C 1200 is started with front/back alignment marks. The wafer is oxidized to form a layer 1202 which is 1 $\mu$m thick. A thick layer of phosphosilicate glass (PSG) 1206 is deposited to a depth of about 8 $\mu$m. This layer 1206 is etched away except for small mesa regions which will be in the center of the coil. This PSG mesa in layer 1206 acts as a window support and a Permalloy plating support, but will be removed later in the process. A set of dielectric layers are deposited on the front of Wafer 6C 1200 to act as the optical window 1210; these layers are similar to those shown in FIG. 8B. These layers can be deposited by e-beam evaporation, sputtering, or by PECVD deposition. The layers must be mechanically strong and optically transparent. In order to reduce optical reflections from the incident surfaces, anti-reflection coatings need to be incorporated. In this process ¼ wavelength layers of silicon dioxide cannot be used, as an oxide etch will be used later in the process to remove the sacrificial PSG. Either a dielectric stack can be used here that is impervious to the PSG etch, or the silicon-rich silicon nitride layer can be deposited by itself, and anti-reflecfive (AR) coatings can be deposited on the window after the other processing is completed.

Permalloy 1212 (or equivalent magnetic material) is now selectively plated around the central coil region of the device including over angled side walls 1214. This layer will provide a magnetic return for the coil structure. The permalloy layer 1212 is preferably between 1 and 2 $\mu$m thick.

An intermetal dielectric 1218 is deposited to insulate the coil layers to be added later from the plated metal 1212 and the silicon substrate 1200. A contact hole 1222 is patterned and etched in the feedthrough 1242 of the wafer from the front surface 1224 of the wafer assembly to allow electrical connection between the front metal layers and the back metal layers, forming connection 1226 through connection 1222 in the feedthrough 1108.

The first Cu coil layer 1228 is then selectively plated on the front dielectric layer 1218 and the contact holes 1222. This Cu layer 1228 provides one layer of the coil, the electrical connection from the coil to the feedthrough region, and one half of the electrical feedthrough. If additional coil layers 1230 are desired, as shown in the cross section, additional dielectric layers can be deposited and contacts formed to the first coil layer, and Cu can be selectively plated above the first coil, forming additional turns for the coil structure, to make thin film inductive data storage heads.

Turning next to the back side of wafer 6C 1200, a mask is patterned on the backside of Wafer 6C 1200 and DRIE etched through to the oxide layer 1202 and Cu feedthrough 1226 on the front side of the wafer. This etch forms the lens holder 1240 and the feedthrough hole 1242. A dielectric layer is then deposited selectively from the backside of the wafer. This dielectric can be a nitride layer sputtered through a shadow mask, screen printed epoxy resin into the feedthrough holes, or vacuum deposited Paralyene. The dielectric is then selectively removed from the center of the feedthrough proximal the contact 1222, either by oxygen RIE etching with a shadow mask, or by RIE etching of the nitride with no mask. This leaves dielectric on the sidewalls of the holes, providing electrical insulation for the feedthrough metal.

A Cu layer 1250 is now selectively plated from the back side of the wafer assembly, using, for example, a deposited plating base, a sprayed-on layer of photoresist, and lithographic exposure. An optional layer of Au 1252 can be plated as the final layer as an aid for wire bonding in the final device. The oxide layer and the Cu on the front surface are the support for this plated metal, so that a "diaphragm" of plated Cu 1222 spans the feedthrough region. The oxide window and the sacrificial PSG (region 1206) is then selectively etched from the backside of the wafer, leaving the optical window. An AR coating, if needed, can be deposited from the backside of the wafer, through a shadow mask, which protects the bond pads from the AR coating.

In FIG. 12B 1204, a process flow chart illustrating the steps for the embodiment of FIG. 12A is shown. The wafer is oxidized in step 1201, and PSG is deposited and pattern etched.

Window layers are deposited in step 1205 and permalloy is plated in step 1207. The coil and coil connections, together with appropriate insulation, is defined in step 1209, and a contact is formed through the window material in the feedthrough to allow backside connectivity in step 1211.

Then the lens holder and feedthrough are formed in step 1215, and dielectric deposited on the sidewall of the feedthrough in step 1217.

Copper and optionally gold are then formed in the feedthrough in step 1219.

The resulting wafer of devices can be diced to provide numerous individual coil devices from the processed wafer assembly. The coil devices can then be adhesively attached to a conventional ceramic slider.

CONCLUSIONS

These embodiments show only a small number of the possible variants in processes which provide integrated coils and lens holders.

Other features and advantages of the present invention and alterations to the preferred embodiment will become apparent to a person of skill in the art who studies the present invention disclosure. For example, Therefore, the scope of the present invention is to be limited only by the following claims.

What is claimed is:

1. A lens holder and a coil assembly for reading and writing magneto-optical data forming an integrated assembly in semiconductor wafers comprising a first wafer having a front and a back;

a second wafer;

a coil formed in a depression on a surface on said front of said first wafer, said depression being of a sufficient depth to maintain said surface substantially planar when said surface is bonded to said second wafer;

said coil having leads forming a part of said first wafer to spaced bonding pads on said first wafer;

said second wafer being bonded to said surface of said first wafer;

a first region in said second wafer supporting a lens aligned with an opening in substantially a center of said coil for passing a light through said opening; and a second region in said second wafer bonded to said first wafer comprising a feedthrough passing through said second wafer for allowing electrical connections to said bonding pads.

2. The lens holder and coil assembly of claim 1 wherein said opening in said coil comprises a window layer for passing a light beam through said lens and said window layer for reading and writing data on a disk.

3. The lens holder and coil assembly of claim 2 wherein said window layer comprises silicon-rich silicon nitride.

4. The lens holder and coil assembly of claim 2 wherein the window layer comprises in succession silicon dioxide, a dielectric material, and silicon dioxide.

5. The lens holder and coil assembly of claim 2 wherein the window layer further comprises the dielectric material being selected from a group including silicon nitride, silicon-rich silicon nitride, aluminum nitride, and alumina.

6. The lens holder and coil assembly of claim 2 wherein said bonding pads comprise extensions of said coil in said first wafer facing said feedthrough in said second wafer, whereby external leads are connected to said bonding pads.

7. The lens holder and coil assembly of claim 2 further compromising a magnetic material proximal said coil in said depression of said first wafer.

8. A method for having a lens holder and a coil forming an integrated assembly in semiconductor wafers comprising a first wafer having a front and back;

a second wafer;

forming a coil on a surface on said front of said first wafer in a depression, said depression of a sufficient depth to maintain said surface substantially planar for bonding said surface to said second wafer;

forming leads as a part of said first wafer from said coil to spaced bonding pads in said first wafer;

bonding said second wafer to said surface of said first wafer;

supporting a lens in a first region in said second wafer aligned with an opening in substantially a center of said coil for passing a light through said opening; and forming a feedthrough in a second region in said second wafer passing through said second wafer comprising a method for electrical connection to said bonding pads.

\* \* \* \* \*